(12) United States Patent
Paluch

(10) Patent No.: US 11,516,035 B2
(45) Date of Patent: Nov. 29, 2022

(54) ENABLING CHAT SESSIONS

(71) Applicant: Comcast Cable Communications, LLC, Philadelphia, PA (US)

(72) Inventor: Bryan K. Paluch, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/945,177

(22) Filed: Jul. 31, 2020

(65) Prior Publication Data

US 2021/0194712 A1    Jun. 24, 2021

Related U.S. Application Data

(63) Continuation of application No. 15/687,104, filed on Aug. 25, 2017, now Pat. No. 10,778,454, which is a continuation of application No. 13/104,445, filed on May 10, 2011, now Pat. No. 9,787,486.

(51) Int. Cl.
*H04L 12/18* (2006.01)
*H04N 21/438* (2011.01)
*H04N 21/4788* (2011.01)

(52) U.S. Cl.
CPC ........ *H04L 12/1818* (2013.01); *H04L 12/185* (2013.01); *H04N 21/4383* (2013.01); *H04N 21/4788* (2013.01)

(58) Field of Classification Search
CPC .............. H04L 12/1818; H04L 12/185; H04N 21/4383; H04N 21/4788
See application file for complete search history.

(56) References Cited

U.S. PATENT DOCUMENTS

| | | | |
|---|---|---|---|
| 8,555,177 B1 * | 10/2013 | Junee | H04L 12/1822 715/751 |
| 8,688,781 B2 | 4/2014 | Taleb et al. | |
| 8,695,033 B2 | 4/2014 | Fasting | |
| 8,769,422 B2 | 7/2014 | Russell et al. | |
| 8,832,734 B2 | 9/2014 | Scott et al. | |
| 8,887,203 B2 | 11/2014 | Kim et al. | |

(Continued)

FOREIGN PATENT DOCUMENTS

| | | |
|---|---|---|
| EP | 2009920 A1 | 12/2008 |
| WO | 0150753 A1 | 7/2001 |

*Primary Examiner* — Justin S Lee
(74) *Attorney, Agent, or Firm* — Banner & Witcoff, Ltd.

(57) ABSTRACT

Methods, systems, computer readable media, and apparatuses for enabling chat sessions are presented. In response to detecting that a first user is viewing a first program, a chat invitation may be automatically transmitted to a second user. The chat invitation may identify the first user and the first program, and further may invite the second user to initiate a chat session with the first user. An updated chat invitation may be automatically transmitted in response to detecting that the first user has changed to viewing a second program, and a chat session that has been initiated may subsequently be transferred to another device. Content prioritization settings may be accounted for in transmitting one or more chat invitations, and before a chat invitation is transmitted, it may be determined that a sufficient amount of time has elapsed to suggest that the user will continue viewing the first program.

22 Claims, 20 Drawing Sheets

(56) References Cited

U.S. PATENT DOCUMENTS

| | | | |
|---|---|---|---|
| 2002/0131565 A1* | 9/2002 | Scheuring | G06Q 10/109 379/88.19 |
| 2002/0144273 A1* | 10/2002 | Reto | H04N 21/4781 725/86 |
| 2004/0068567 A1* | 4/2004 | Moran | H04L 67/14 709/227 |
| 2004/0174392 A1* | 9/2004 | Bjoernsen | G06Q 10/10 715/751 |
| 2005/0132009 A1* | 6/2005 | Solie | H04L 51/04 709/206 |
| 2006/0190966 A1* | 8/2006 | McKissick | H04N 21/812 725/61 |
| 2007/0168444 A1* | 7/2007 | Chen | G06Q 10/109 709/207 |
| 2008/0134235 A1* | 6/2008 | Kalaboukis | H04N 21/4788 725/32 |
| 2008/0205456 A1 | 8/2008 | Hemley et al. | |
| 2008/0250456 A1 | 10/2008 | Gervais et al. | |
| 2008/0303959 A1 | 12/2008 | Mears et al. | |
| 2009/0030981 A1* | 1/2009 | Knoepp | G06Q 10/107 709/204 |
| 2009/0075737 A1 | 3/2009 | Harris | |
| 2009/0100463 A1 | 4/2009 | St. John-Larkin | |
| 2009/0138606 A1 | 5/2009 | Moran et al. | |
| 2009/0293079 A1* | 11/2009 | McKee | H04L 51/32 725/10 |
| 2009/0327915 A1 | 12/2009 | Holdaway et al. | |
| 2010/0017814 A1* | 1/2010 | Archer | H04N 21/44222 725/14 |
| 2010/0022225 A1 | 1/2010 | Benger et al. | |
| 2010/0031193 A1 | 2/2010 | Stark et al. | |
| 2010/0037277 A1 | 2/2010 | Flynn-Ripley et al. | |
| 2010/0066808 A1 | 3/2010 | Tucker et al. | |
| 2010/0205541 A1 | 8/2010 | Rapaport et al. | |
| 2010/0226288 A1 | 9/2010 | Scott et al. | |
| 2011/0047487 A1 | 2/2011 | DeWeese et al. | |
| 2011/0060994 A1 | 3/2011 | Maxwell et al. | |
| 2011/0122857 A1 | 5/2011 | Loc et al. | |
| 2011/0126258 A1 | 5/2011 | Emerson et al. | |
| 2011/0179180 A1* | 7/2011 | Schleifer | H04L 12/1818 709/227 |
| 2011/0225614 A1* | 9/2011 | West | H04N 21/4788 725/63 |
| 2011/0239243 A1* | 9/2011 | Dierks | H04H 60/33 725/14 |
| 2011/0242266 A1* | 10/2011 | Blackburn | H04N 21/42204 348/14.01 |
| 2011/0242270 A1* | 10/2011 | Dinka | H04N 7/173 348/14.11 |
| 2011/0246908 A1* | 10/2011 | Akram | H04N 21/27 715/752 |
| 2011/0273625 A1* | 11/2011 | McMahon | H04N 21/4113 348/734 |
| 2012/0174157 A1 | 7/2012 | Stinson, III et al. | |
| 2012/0242776 A1* | 9/2012 | Tucker | H04L 12/1827 348/14.03 |
| 2013/0073353 A1* | 3/2013 | Des Jardins | G06Q 30/0241 705/14.4 |

* cited by examiner

ENABLING CHAT SESSIONS

RELATED APPLICATIONS

The present application is related to, incorporates by reference, and is a continuation of U.S. patent application Ser. No. 15/687,104, filed Aug. 25, 2017, which is a continuation of U.S. patent application Ser. No. 13/104,445, filed May 10, 2011.

BACKGROUND

Watching television has always been a favorite pastime for many people. As time went by and technology improved, new features such as the video cassette recorder (VCR), onscreen program guide, and digital video recorder (DVR) have given viewers more options and control over their viewing experience, thereby enriching that experience. As technology continues to improve, and as more and more viewers become networked, there will always be a demand for increased flexibility and functionality in the video viewing experience. The present disclosure offers a variety of features to further enrich a viewer's experience.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to automatically initiating chat sessions, such as chat sessions about content based on a user accessing the content. According to one or more aspects, in response to detecting that a first user is viewing a first program, a chat invitation may be automatically transmitted to a second user. The chat invitation may identify the first user and the first program, and the chat invitation further may invite the second user to initiate a chat session with the first user.

In one or more arrangements, an updated chat invitation may be automatically transmitted to the second user in response to detecting that the first user has changed to viewing a second program. In one or more additional arrangements, a chat session that has been initiated may subsequently be transferred to another device, such as in response to receiving a request from the user to transfer that chat session. Various other user preferences, such as content prioritization settings, also may be taken into account in sending and/or receiving chat invitations. In addition, in some instances, before a chat invitation is sent automatically, it may be determined that a sufficient amount of time has elapsed since the first user started viewing the first program to suggest that the user will continue viewing the first program.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
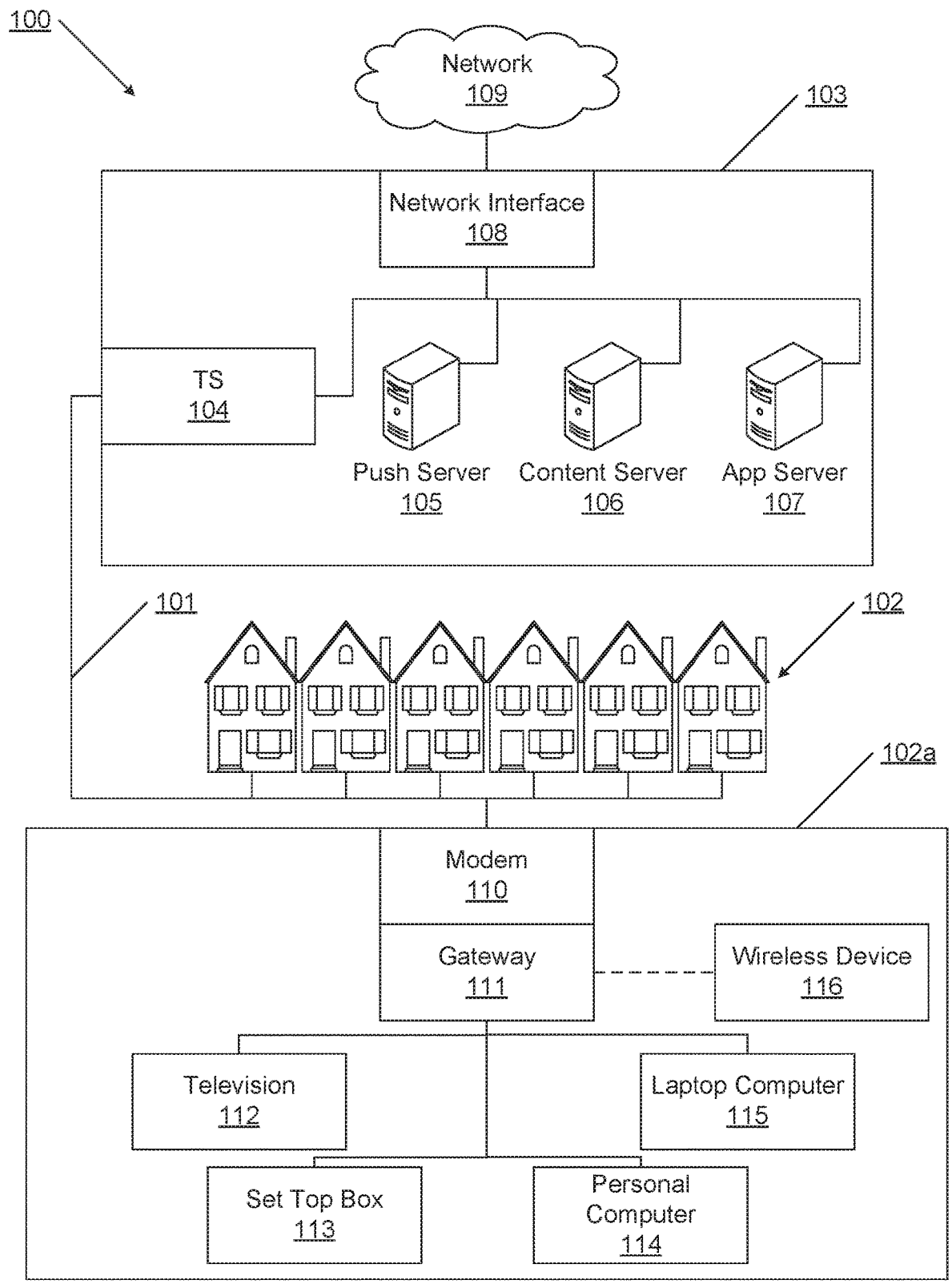
FIG. 1 illustrates an example content distribution network according to one or more aspects described herein.

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for enabling chat sessions.

An example premises 102a, such as a home, may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
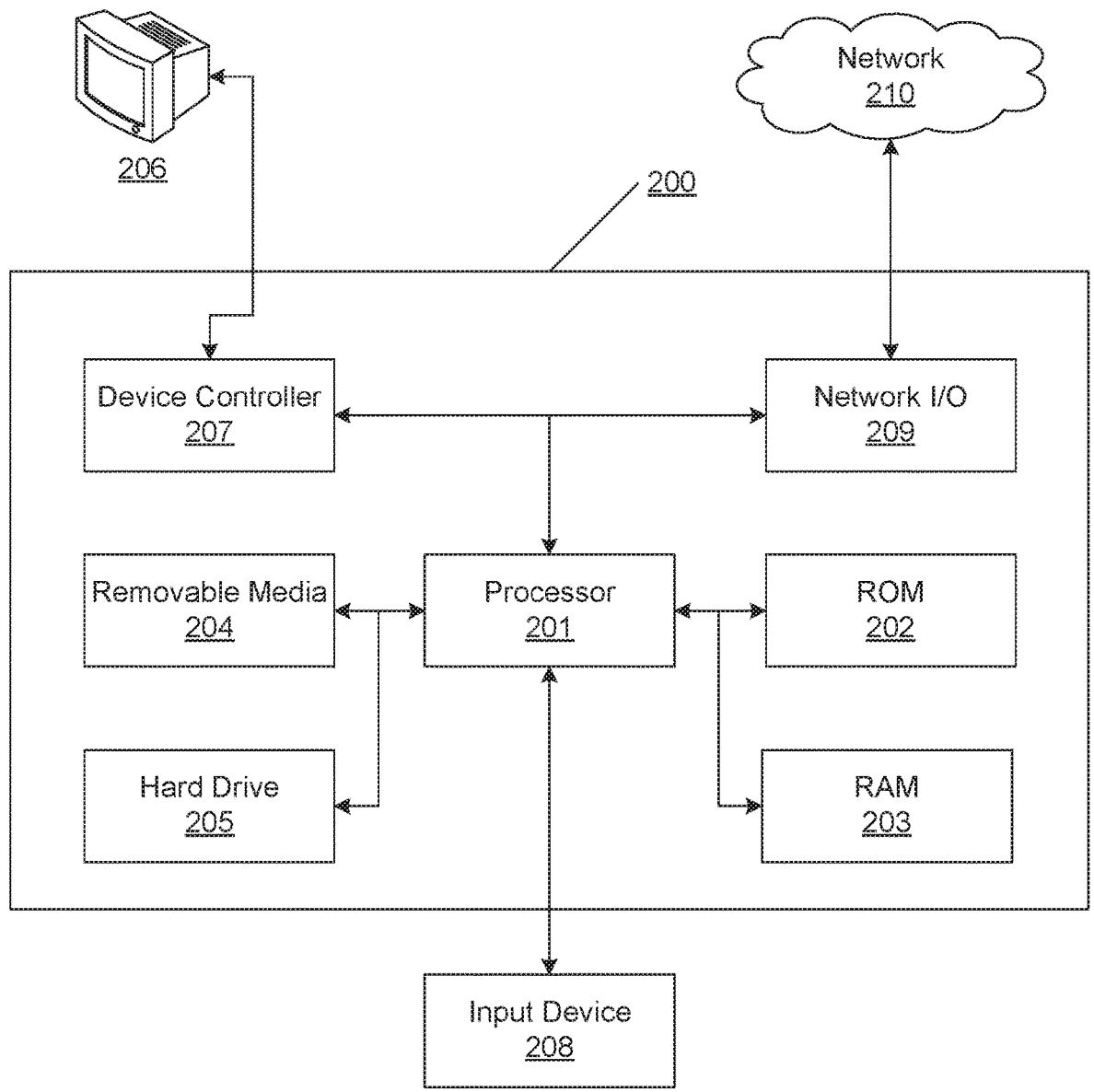
FIG. 2 illustrates an example hardware platform on which the various elements described herein may be implemented according to one or more aspects described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface

209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein may enable chat sessions, for example, between users accessing content from the central office 103. For instance, one such user may be a viewer who is watching a television program being transmitted from the central office 103 or any content provider, while another user could be viewing an Internet stream of a video program from a video server at the central office 103 (or elsewhere). Particular aspects of the disclosure may relate to transmissions between a central office 103 and one or more gateways 111. These and other aspects of the disclosure will be described in detail below.

FIGS. 3A-3J illustrate an example method of enabling chat sessions according to one or more aspects described herein. In one or more arrangements, any and/or all of the example methods described herein may be performed by a computing device, such as computing device 200 or gateway interface device 111, and/or stored as computer-executable instructions in a computer-readable medium, such as ROM 202, RAM 203, removable media 204, and/or hard drive 205.

Figure 3A:
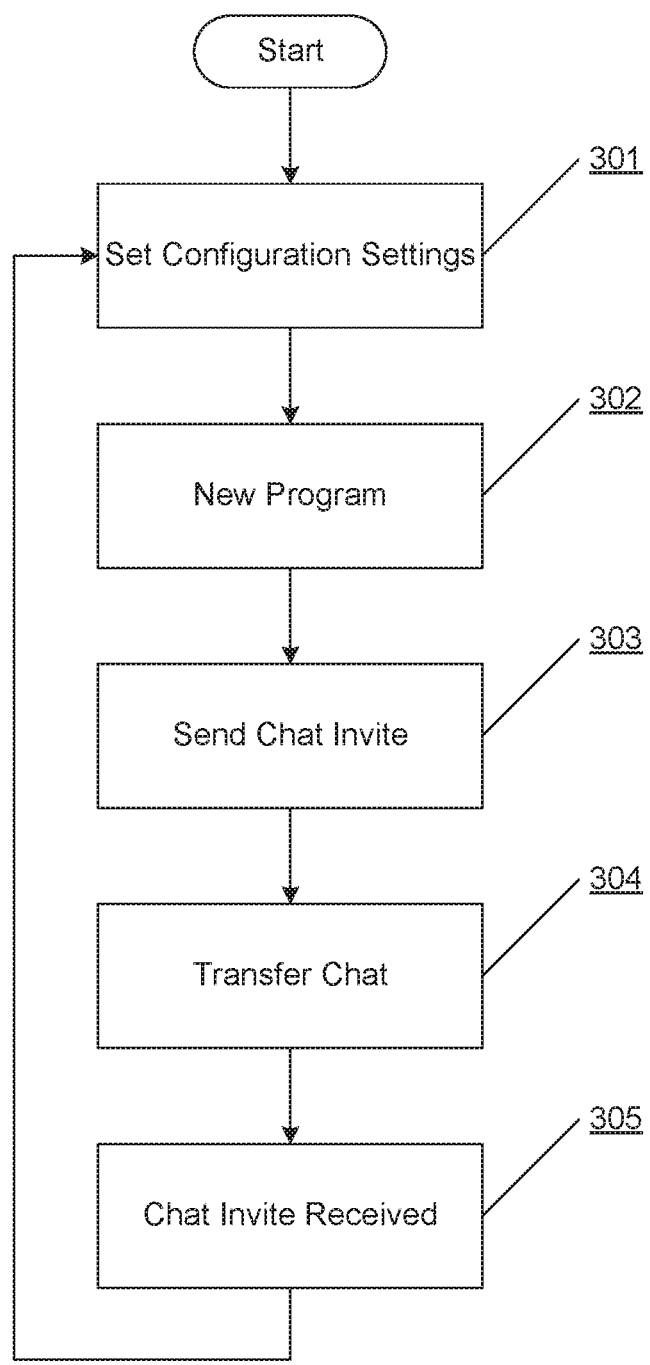
FIGS. 3A to 3J illustrate an example method of enabling chat sessions according to one or more aspects described herein.

In particular, FIG. 3A illustrates a processing loop that may be executed by gateway 111 and/or other devices to facilitate one or more chat sessions between a user or users of such devices. The processing loop may, for instance, include several steps that are performed repeatedly by the one or more devices in enabling chat sessions.

In one or more arrangements, each step in the processing loop may represent a subroutine that is executed as part of the processing loop. For example, in step 301, a configuration subroutine or steps may be executed to set and/or modify any configuration details that are desired. In at least one arrangement, executing the configuration subroutine may include performing one or more steps of the example method illustrated in FIG. 3B, which is further described below. In addition, a new program subroutine or steps may launch or be executed in step 302, a send chat invite subroutine or steps may be executed in step 303, a transfer chat subroutine or steps may be executed in step 304, and/or a chat invite received subroutine or steps may be executed in step 305. In one or more arrangements, executing one or more of these subroutines may involve performing one or more steps of the example methods illustrated in FIGS. 3B-3J, which are further described below.

Figure 4:
FIG. 4 illustrates an example user interface in which content may be displayed according to one or more aspects described herein.

According to one or more aspects, when execution of the processing loop completes (e.g., when execution of the chat invite received steps completes), the entire processing loop may be executed again (e.g., beginning with execution of the configuration). Additionally or alternatively, the repeated execution of the processing loop may continue until the system executing the processing loop is turned off or put in a standby mode. In addition, while the subroutines that make up the processing loop are executed (and/or while any of the example methods described herein are performed), a user device, such as gateway 111, may receive and display or cause to be displayed content from a server, and the example menus described herein may be displayed as overlays on various screens that also include content. FIG. 4 illustrates an example user interface 400 that includes content 401 and an overlay 402.

The individual subroutines or steps that make up the processing loop illustrated in FIG. 3A will now be described.

Figure 3B:
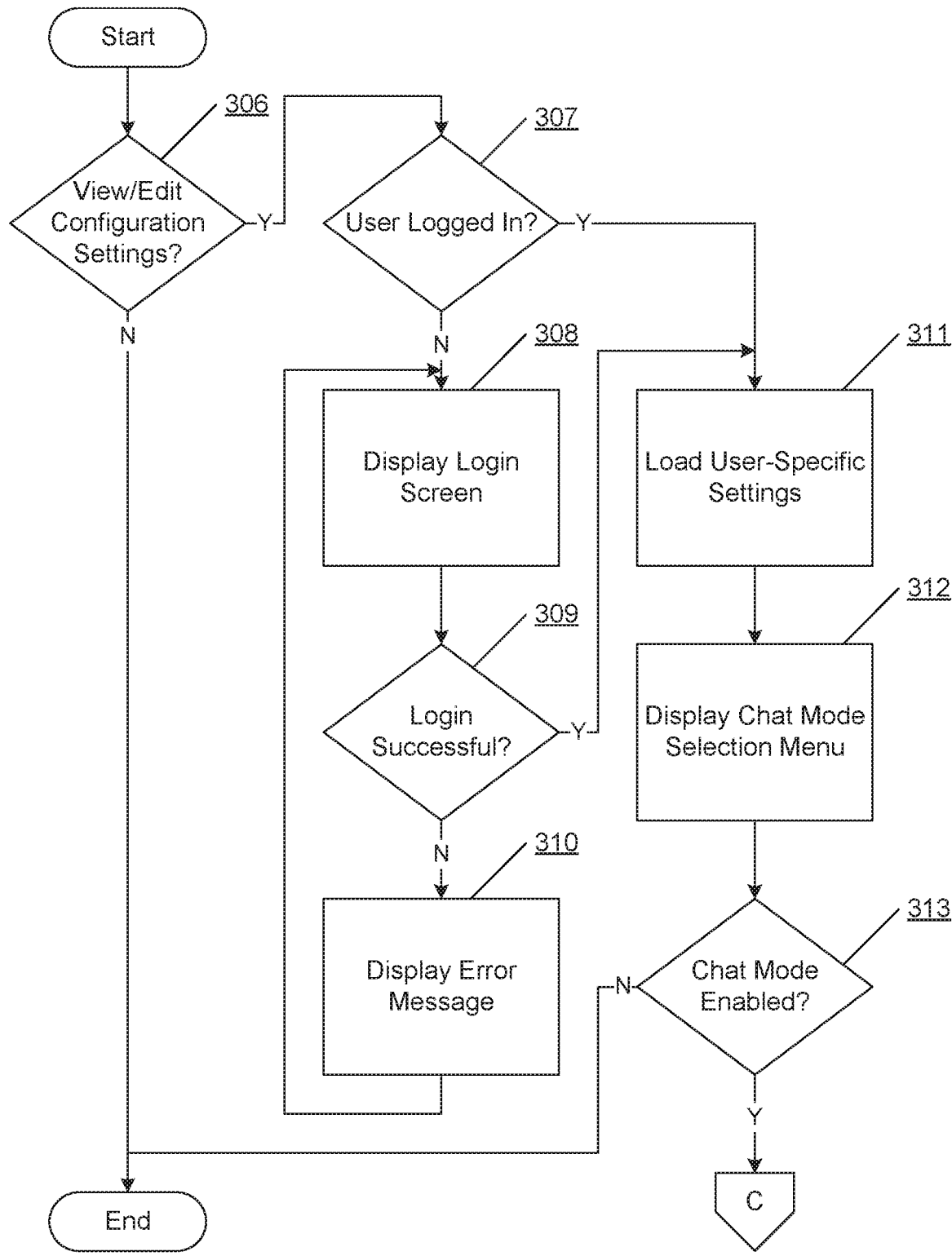
Figure 3C:
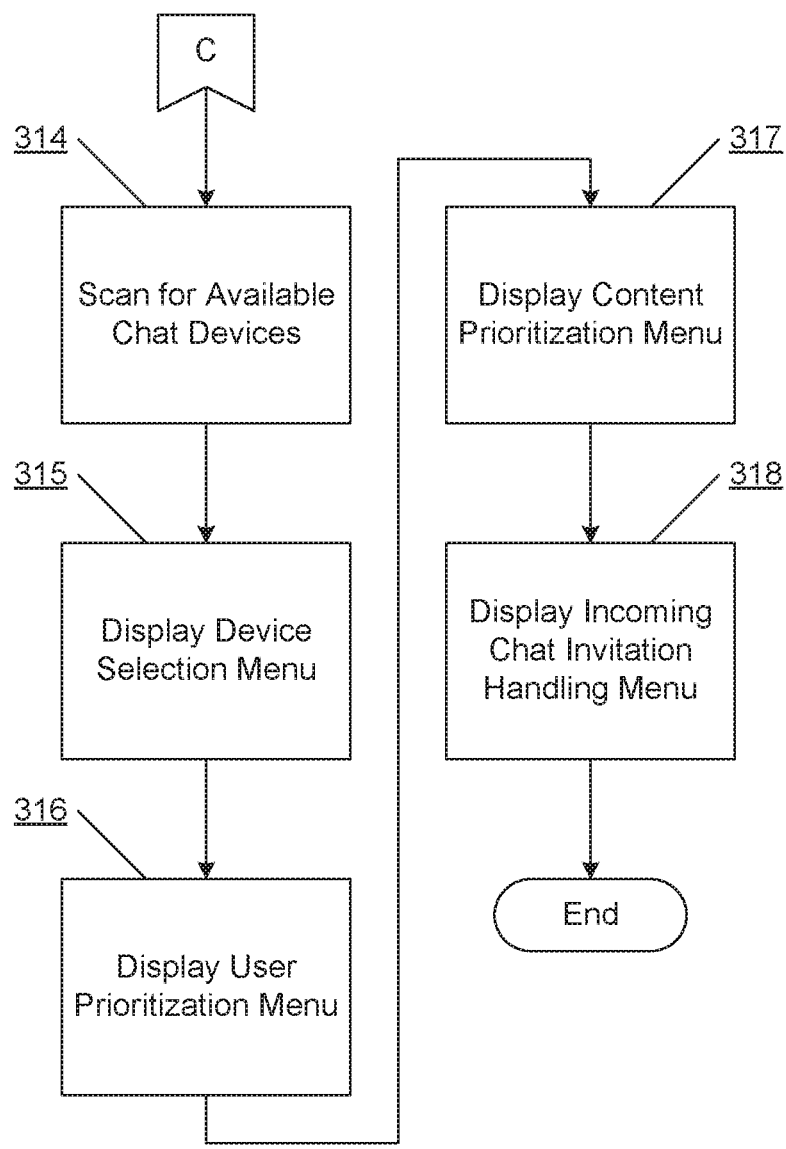

FIG. 3B illustrates a configuration subroutine, or sequence of steps, that may be performed in executing the processing loop described above. During the configuration, one or more screens (e.g., user interface screens) can be displayed on any desired device (e.g., computer 114, television 112) to provide a user with the option of editing any desired chat configuration parameter. In step 306, a gateway 111 (or any other device) can determine whether configuration settings need to be viewed or edited. If configuration settings are to be viewed or edited, the process can proceed to step 307, where it may be determined whether the user (e.g., the user of gateway 111) is logged in. If no configuration settings are to be viewed or edited, the system may proceed with executing the next subroutine in the processing loop (e.g., the new program subroutine 302).

In step 307, the gateway 111 may determine whether the user is logged in. For example, gateway 111 may store information about one or more of its users in separate user profiles or accounts, which may allow gateway 111 to provide personalized and customized experiences to the different users. Accordingly, it may be desirable for a user to be logged in before configuration menus and/or the like are displayed.

If it is determined in step 307 that the user is not logged in, then in step 308, gateway 111 may cause a login screen to be displayed to the user. Such a login screen may, for instance, prompt a user to enter a username and password that gateway 111 may store in association with other details about the user (e.g., the particular user's preferences). Subsequently, gateway 111 may, in step 309, determine whether the user successfully logged in. If the user's login attempt is unsuccessful, then gateway 111 may cause an error message to be displayed in step 310 and thereafter may display the login screen again.

On the other hand, if the user's login attempt is successful in step 309, or if it is determined in step 307 that the user is logged in, then in step 311, gateway 111 may load user-specific settings and preferences. These settings and preferences may deal with a variety of matters, such as the device or devices the user prefers to use in chatting, the particular other users that the user prefers to chat with, the programs that the user prefers to chat about, and the way that incoming and/or outgoing chat invitations should be handled, among other things. By loading these preferences, gateway 111 may allow the user to review and/or modify the various settings, as further described below, such that the user may receive a customized and desirable operating experience.

Figure 5:
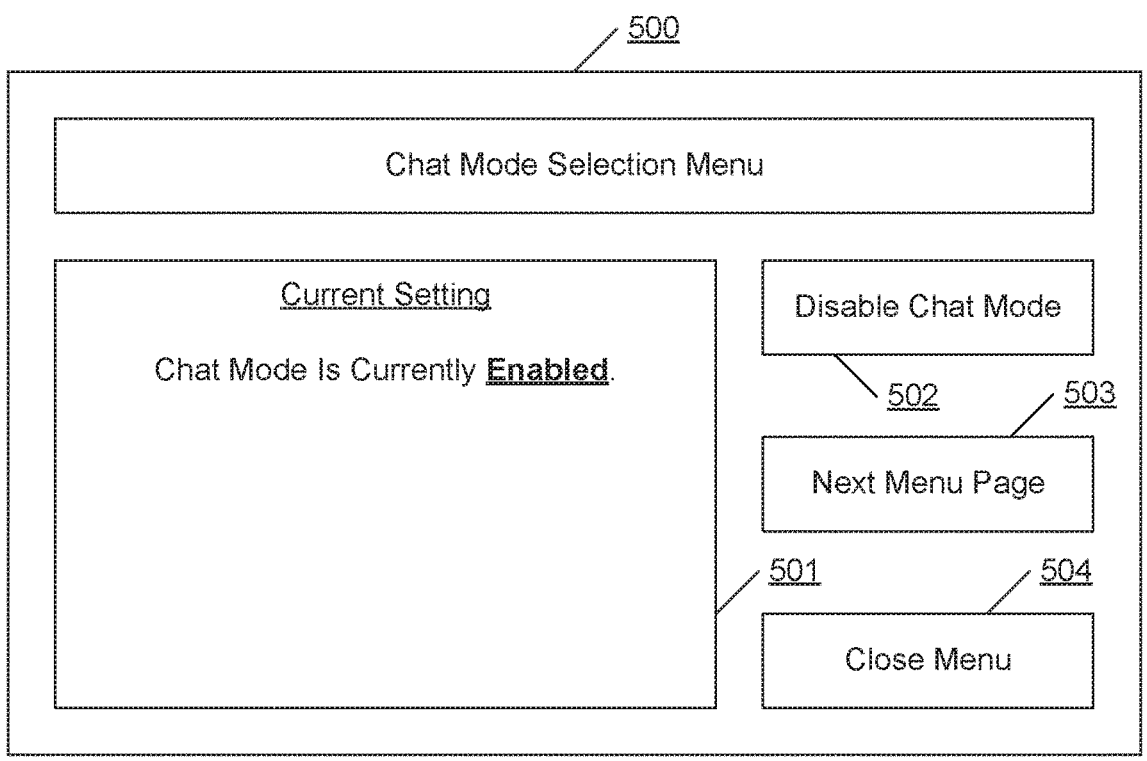
FIG. 5 illustrates an example user interface that includes a chat mode selection menu according to one or more aspects described herein.

In step 312, an initial chat configuration screen may be displayed, and this screen may indicate whether content-based or contextual chat is enabled. FIG. 5 illustrates an example of such an initial chat configuration screen 500. According to one or more aspects, the initial chat configuration screen 500 may include a chat mode selection menu, which may be comprised of one or more display areas and/or user controls. For example, initial chat configuration screen 500 may include a status indicator 501 that indicates whether a content-based or contextual chat mode is currently enabled or disabled. Additionally or alternatively, initial chat configuration screen 500 may include a toggle button 502, which may toggle chat mode from enabled to disabled (or vice versa) when actuated by the user. Initial chat configuration screen 500 further may include a next menu button 503, which may cause another configuration menu to be displayed (e.g., a default chat device selection menu) when actuated by a user, and a close menu button 504.

In step 313, if the chat mode is not enabled, the configuration subroutine or settings may end and the system may proceed with executing the next subroutine in the processing loop (e.g., the new program subroutine 302). On the other hand, if the chat mode is enabled in step 313, then in step 314, gateway 111 may scan for available chat devices in the manner further described below, as gateway 111 may allow the user to choose another device for chatting (e.g., a laptop on the same local network as gateway 111, such as laptop computer 115).

Figure 6:
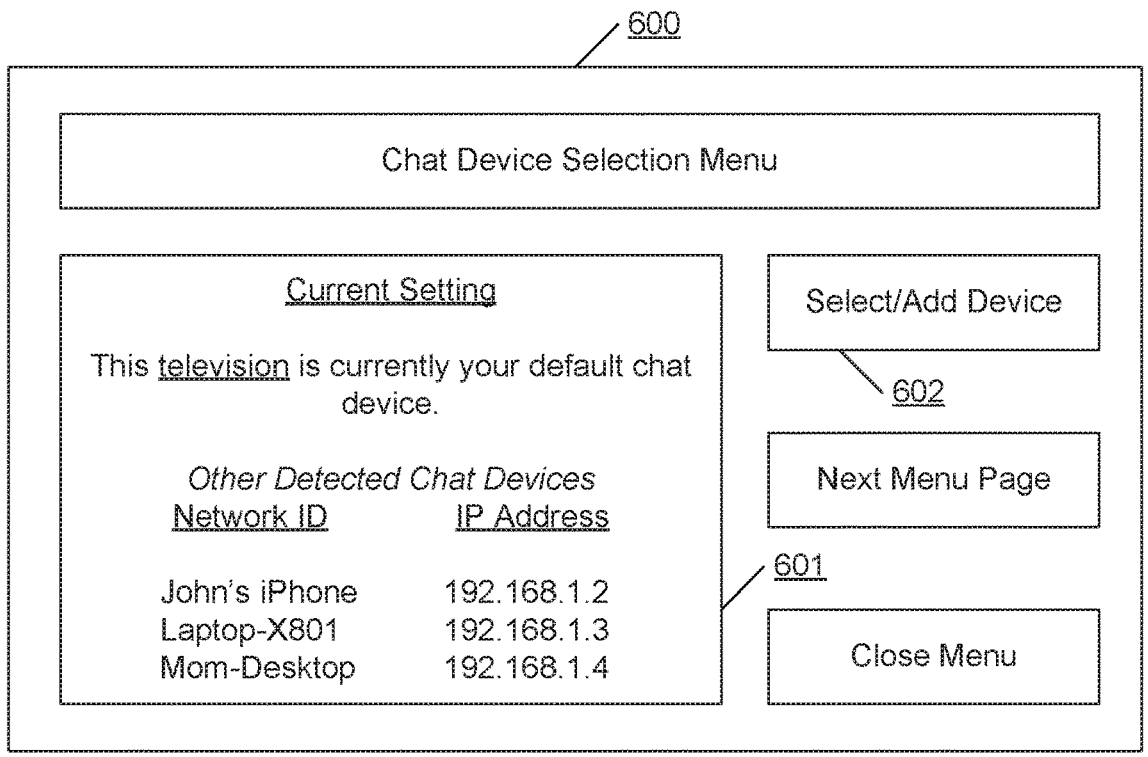
FIG. 6 illustrates an example user interface that includes a chat device selection menu according to one or more aspects described herein.

In step 315, a chat device selection menu may be displayed. FIG. 6 illustrates an example chat device selection menu 600, which may allow a user to view and/or modify various settings related to what device or devices are to be used in chat sessions. For instance, a user may specify that a television or other display device connected to gateway 111 is to be used for viewing content, while a laptop computer connected to gateway 111 is to be used for chatting. These settings may apply to chat sessions initiated by both incoming and outgoing chat invitations, such that if a user were to receive and accept a chat invitation from another user, gateway 111 may initiate the chat session at the laptop computer, for example, rather than on the television.

According to one or more aspects, chat device selection menu 600 may include, for example, a status indicator 601 that indicates the current default chat device and/or other available chat devices. The other available chat devices may include, for instance, other computing devices detected by the system as being connected to a shared local network (e.g., a local network including some or all of the computing devices located in premises 102*a*). In addition, chat device selection menu 600 may include a select/add device button 602, which may allow a user to select a different default chat device (e.g., one of the detected computing devices) or add a new chat device (e.g., by causing the gateway 111 to discover other devices on a network, such as a local network in premises 102*a*, or become discoverable to other devices on the network).

Figure 7:
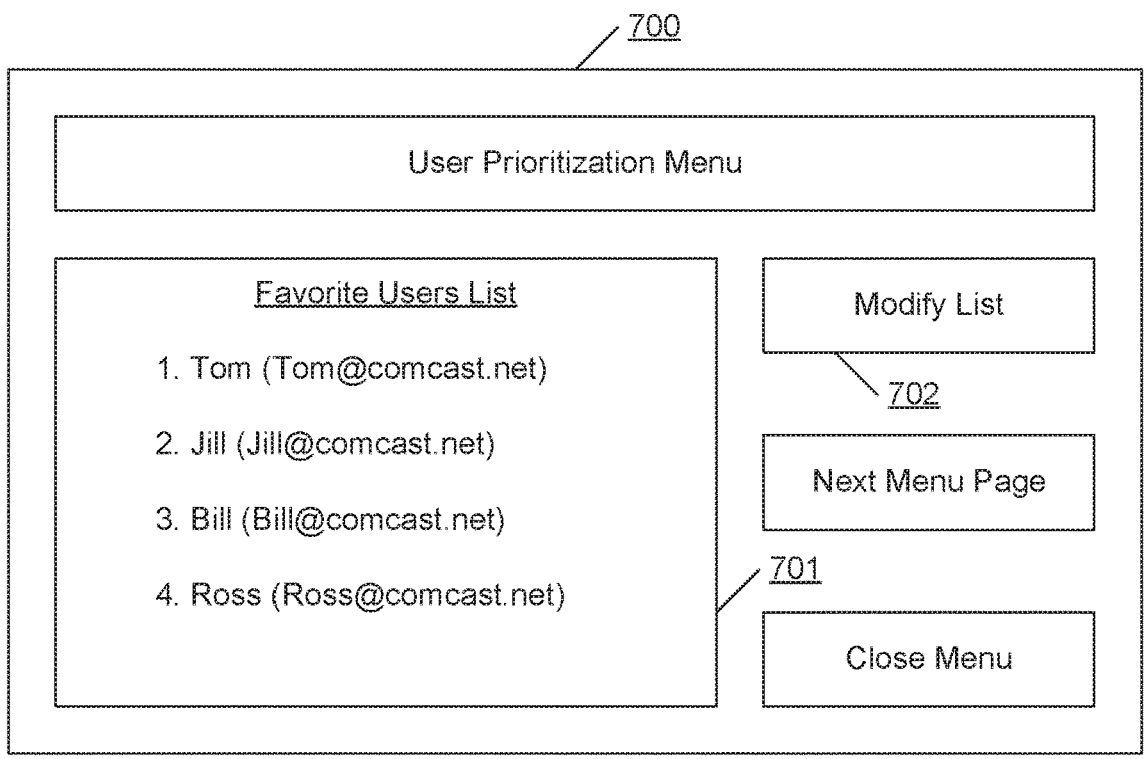
FIG. 7 illustrates an example user interface that includes a user prioritization menu according to one or more aspects described herein.

Another set of configuration options may deal with the prioritization of other users for chatting purposes. For example, in step 316, a user prioritization menu may be displayed. FIG. 7 illustrates an example user prioritization menu 700, via which a user may view and/or modify various settings related to the prioritization of other users. In particular, user prioritization menu 700 may include a favorite users list 701 that represents a listing of one or more other users that the user of gateway 111, for instance, prefers to chat with. User prioritization menu 700 also may include a modify listing button 702, which may allow a user to add and remove users to and from the favorite users list 701. Thus, when gateway 111, for instance, sends out one or more chat invitations, as further described below, gateway 111 may invite users on the favorite users list 701 to chat before inviting other users (e.g., general community members) to chat.

Additionally or alternatively, via user prioritization menu 700, a user may be able to set particular times of day that the user would like to chat with the one or more other users included in the favorite users list 701. For example, the user may wish to chat with Tom between noon and 8 p.m. on Saturdays and Sundays, but with Jill between 7 p.m. and 11 p.m. on Mondays, Tuesdays, Wednesdays, and Thursdays. Via user prioritization menu 700, the user of the system may be able to select, for example, each user included in the favorite users list 701 and provide input (e.g., to gateway 111) specifying these desired time windows for each user included in the list 701. Thus, when gateway 111, for instance, sends or receives chat invitations to users included in the list 701, gateway 111 might only send or accept such chat invitations during the specified time windows, and at other times, gateway 111 might not send or might decline chat invitations automatically.

Figure 8:
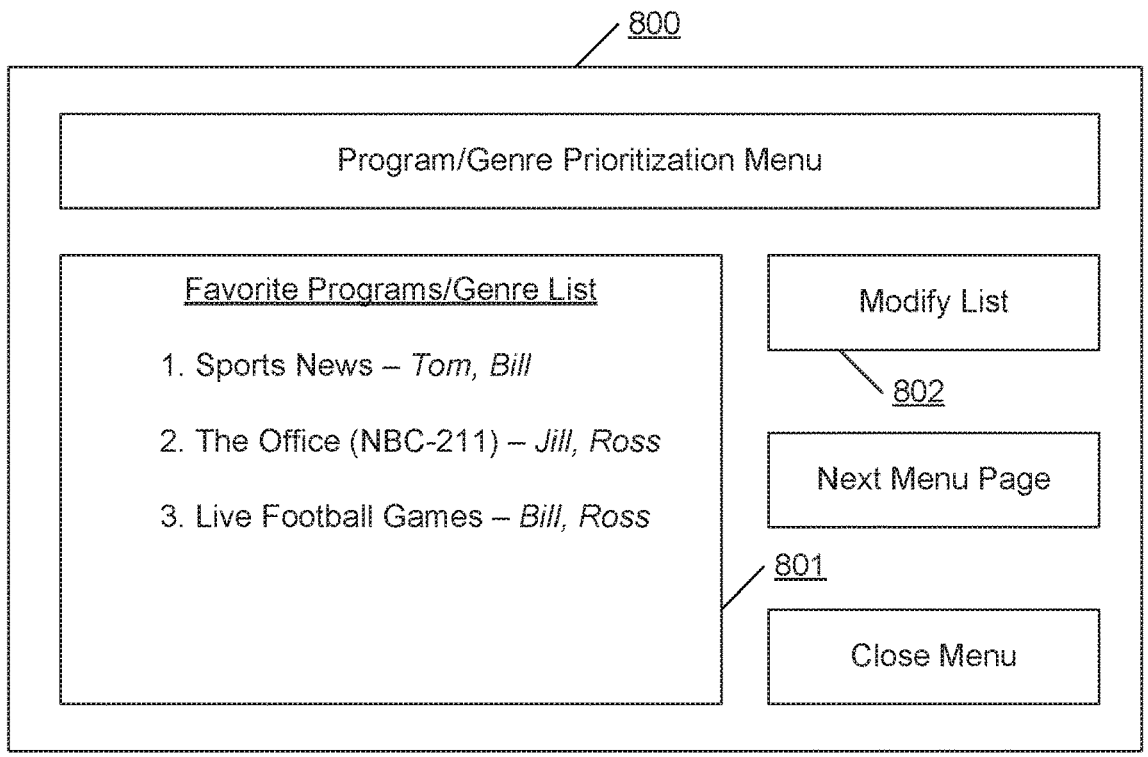
FIG. 8 illustrates an example user interface that includes a content prioritization menu according to one or more aspects described herein.

Another set of configuration options may deal with prioritization of particular programs and/or the genres of content that form the subject of an initial chat invitation. For example, in step 317, a content prioritization menu may be displayed. FIG. 8 illustrates an example content prioritization menu 800, via which a user may view and/or modify various settings related to which programs and/or genres of content that the user prefers to chat about. In particular, content prioritization menu 800 may include a favorite programs/genres list 801 that represents a listing of one or more programs and/or genres of content that the users prefers to chat about (e.g., in comparison to other programs and/or genres of content). Content prioritization menu 800 also may include a modify listing button 802, which may allow a user to add, remove, modify, and reorder items in the favorite programs/genres list 801. Thus, when gateway 111, for instance, sends out one or more chat invitations, as further described below, gateway 111 might only send out chat invitations when the user is viewing a program that is included in favorite programs/genres list 801 or of a genre matching one of the genres of content included in the list 801. Additionally or alternatively, when gateway 111 receives a chat invitation from another user, gateway 111 may automatically accept the chat invitation if it concerns a program or genre of content included in the favorite programs/genres list 801 and might automatically decline the chat invitation if it does not concern a program or genre of content included in the list 801.

In at least one arrangement, the content prioritization menu 800 further may allow the user to specify which other users (e.g., other users included in favorite users list 701) are preferred for chatting about particular programs and/or genres of content. For example, in addition to favorite programs/genres list 801 including the various programs and/or genres of content that the user prefers to chat about, favorite programs/genres list 801 also may include and/or indicate which other users are preferred for chatting about particular programs and/or genres of content. For instance, the favorite programs/genres list 801 may indicate that the user prefers to chat about Sports News programs with Tom and Bill, "The Office" with Jill and Ross, and Live Football Game programs with Bill and Ross, as seen in the example user interface illustrated in FIG. 8. Such genre and program classifications can also be prioritized between the two, such that program preferences may be applied before genre preferences (e.g., looking for a match among genre preferences only if there is no match for watching the currently-watched program)

Figure 9:
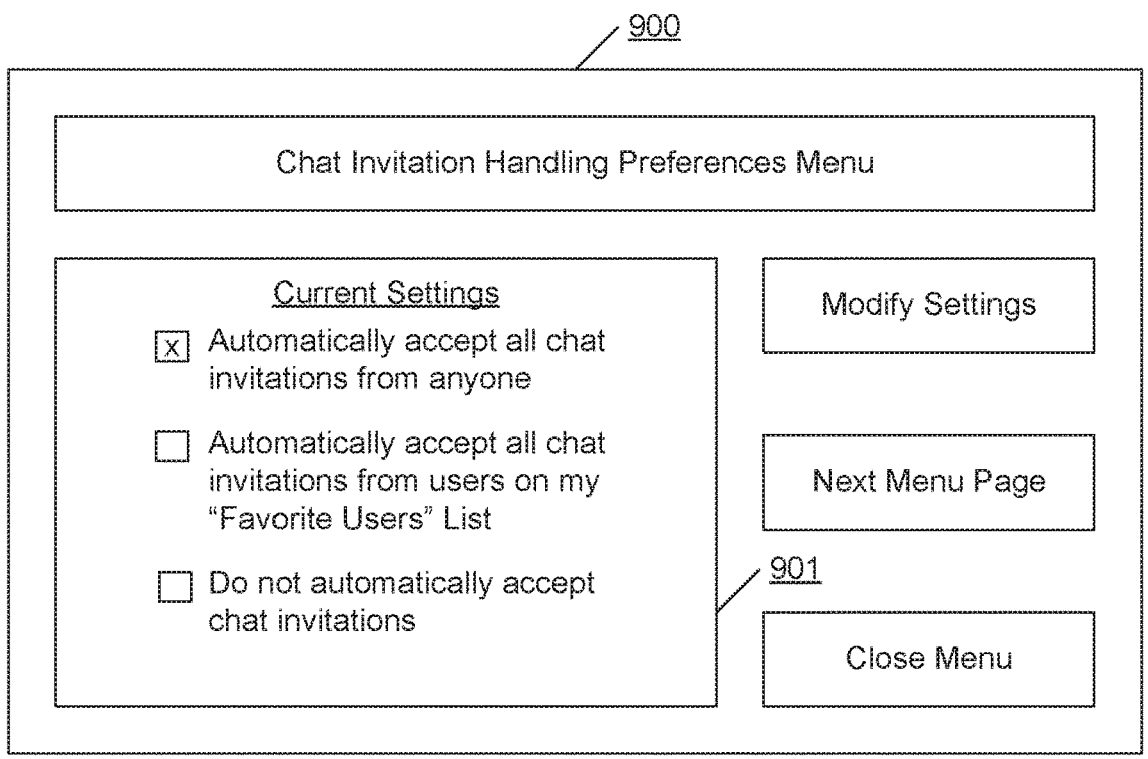
FIG. 9 illustrates an example user interface that includes an incoming chat invitation handling menu according to one or more aspects described herein.

Another set of configuration options may deal particularly with how incoming chat invitations are handled. For example, in step 318, an incoming chat invitation handling menu may be displayed, via which a user may view and/or modify various settings related to incoming chat invitations, such as whether and how incoming chat invitations should be automatically accepted and/or declined. FIG. 9 illustrates an example user interface that includes such a menu. According to one or more aspects, chat invitation handling menu 900 may include a preferences list 901, which a user may interact with to specify one or more preferences. For example, a user may specify, via preferences list 901 and/or chat invitation handling menu 900, that all incoming chat invitations should be automatically accepted, that all incoming chat invitations from users on a favorite users list (e.g., favorite users list 701) be automatically accepted, or that no chat invitations should be automatically accepted. Additionally or alternatively, via preferences list 901 and/or chat invitation handling menu 900, the user also may specify on which device(s) chat sessions, chat invitations, and/or chat messages should be displayed. The user may also be presented with an option to upgrade a chat from a text chat to an audio and/or video chat session using the same or different device.

According to one or more aspects, after the chat invitation handling menu 900 is displayed to and/or closed by the user, the configuration subroutine 301 may end and the next subroutine in the processing loop (e.g., the new program subroutine 302) may be executed. Additionally or alternatively, one or more of the configuration screens may include a "Close Menu" button (or the like) that allows the user to cancel viewing all of the menus (in contrast to merely proceeding to displaying the next menu in the series). If the user chooses to cancel viewing all of the menus after only viewing one or two of the menus described above, for instance, the configuration subroutine 301 similarly may end and the system may proceed at that point with executing the next subroutine in the processing loop (e.g., the new program subroutine 302).

Figure 3D:
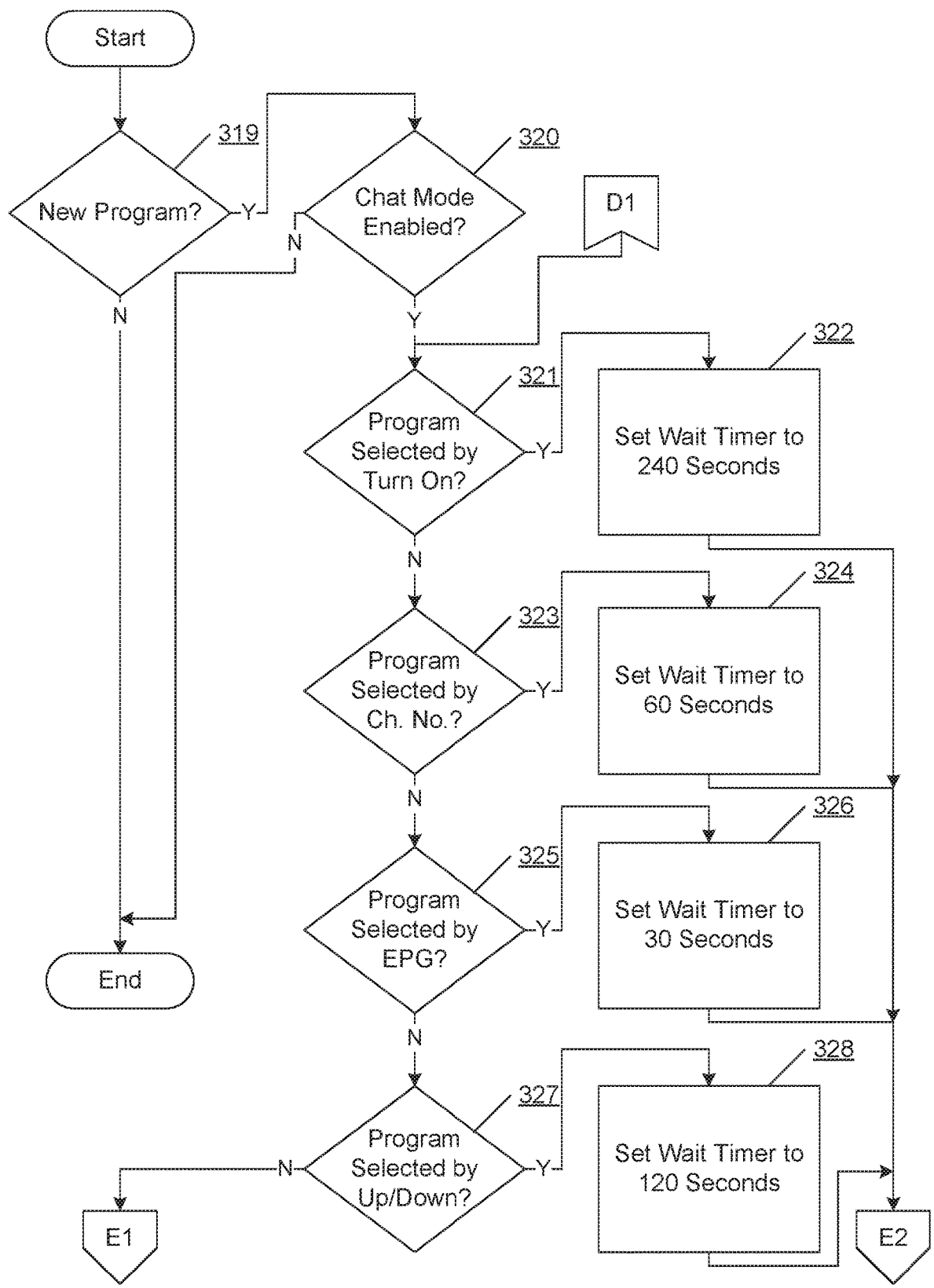
Figure 3E:
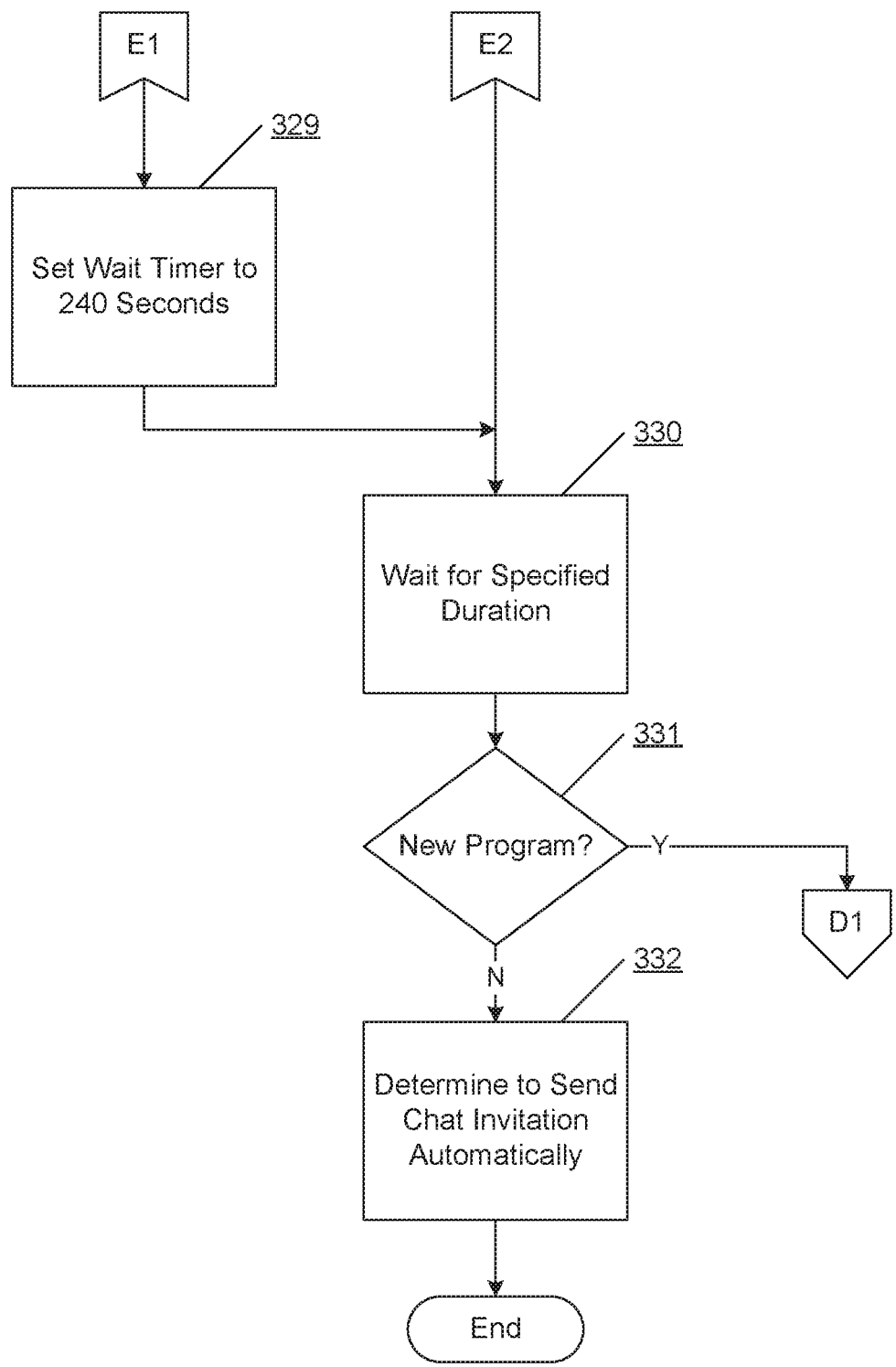

Returning to the overall processing loop of FIG. 3A, if no configuration options need to be viewed or edited, the process may proceed to step 302, where it may be determined if a user is accessing new or different content, such as by beginning to watch a television program, changing channels, starting a video on demand stream, etc. FIGS. 3D and 3E illustrate a new program subroutine 302 that may be performed at this stage of the overall processing loop.

In step 319, it may be determined whether a new program is being viewed. For example, to determine whether a new program is being viewed, gateway 111 may determine whether it was just turned on (or whether an associated display device, e.g., television 112, was just turned on), whether a new channel number was entered, whether a new program or channel was selected via an electronic program guide, whether the channel was changed (e.g., via a channel up or channel down command), or whether the previous program has ended (which may involve the gateway 111 comparing the current time with electronically stored and accessible program scheduling information).

If it is determined, in step 319, that a new program is not being viewed, then the new program subroutine may end. If this occurs, the process may proceed to the next subroutine in the processing loop (e.g., the send chat invite subroutine 303). On the other hand, if it is determined in step 319, that a new program is being played, then in step 320, it may be determined whether a content-based or contextual chat mode is currently enabled. According to one or more aspects, this may depend on whether the user previously enabled chat mode (e.g., via the chat mode selection menu described above in step 312).

If it is determined, in step 320, that chat mode is not currently enabled, then the new program function or subroutine may end, and the process may proceed to the next steps or subroutine in the processing loop. On the other hand, if it is determined in step 320 that chat mode is currently enabled, then a series of steps may be executed to determine how the new program was selected, as this may impact how long gateway 111, for instance, may wait before automatically sending out a chat invitation. According to one or more aspects, it may be desirable to wait before automatically sending out a chat invitation in case the user selects another program before or shortly after a chat invitation is sent out (e.g., to rule out the possibility that the user is merely flipping through channels). As explained below, the manner in which the new program is selected may correspond to a higher or lower likelihood that the user is flipping through channels, and accordingly may impact the amount of time a device may wait before sending out a chat invitation.

Therefore, in step 321, it may be determined whether the new program was selected because a device (e.g., gateway 111, an associated display device, such as television 112, etc.) was just turned on. If it is determined in step 321 that the new program was selected because a device was just turned on, then in step 322, a wait timer may be set to a relatively long amount of time (e.g., 240 seconds). In this situation, it may be desirable to set the wait timer to a relatively long amount of time because if the device was just turned on, the user's selection of the current program may be coincidental (e.g., because the current program simply happened to be on at the current time and on a channel that the user was viewing during a previous session) rather than intentional, and thus, it may be likely that the user will shortly select another program. If the new program was not selected in this way, the process may proceed step 323 to evaluate other factors and possibly set the wait timer to a different length of time.

In step 323, it may be determined whether the program was selected because a new channel or service number was entered using, for example, a numeric keypad. If it is determined in step 323 that the new program was selected because a new channel or service number was entered, then in step 324, the wait timer may be set to a relatively moderate to short amount of time (e.g., 60 seconds). In this situation, it may be desirable to set the wait timer to a relatively moderate to short amount of time because if a user entered a particular channel or service number (e.g., by pressing one or more buttons corresponding to the channel number on an associated remote control), it is more likely that the user will continue watching the selected channel and the particular program currently playing on that channel. Therefore, the device might not need to wait as long to rule out the possibility that the user is just flipping through the channels before sending out a chat invitation. If the new program was not selected in this way, the process may proceed step 325 to evaluate other factors and possibly set the wait timer to a different length of time.

In step 325, it may be determined whether the new program was selected via an onscreen electronic program guide (e.g., by interacting with a user interface and choosing the program from a listing included in the user interface). If it is determined in step 325 that the new program was selected via an electronic program guide, then in step 326, the wait timer may be set to a relatively short amount of time (e.g., 30 seconds). In this situation, it may be desirable to set the wait timer to a relatively short amount of time because if a user selected the new program via an electronic program guide, it is more likely that the user will continue watching the selected program. Therefore, as in the situation where the program is selected because a particular channel number was entered, the device might not need to wait as long (before sending out a chat invitation) to rule out the possibility that the user is just flipping through the channels. If the new program was not selected in this way, the process may proceed to step 327 to evaluate more factors and possibly set the wait timer to a different length of time.

In step 327, it may be determined whether the new program was selected via a channel up or channel down command (e.g., by pushing a channel up or down button on an associated remote control). If it is determined in step 327 that the new program was selected via a channel up or channel down command, then in step 328, the wait timer may be set to a relatively moderate to long amount of time (e.g., 120 seconds). In this situation, it may be desirable to set the wait timer to a relatively moderate to long amount of time because if a user selected the new program via a channel up or channel down command, it is less likely that the user will continue watching the selected channel and the particular program currently playing on that channel and more likely that the user is merely flipping through channels to see what programs are currently playing. Thus, if the new program was selected in this way, the device might need to wait for a longer amount of time than in some of the other situations described above to determine that the user is not just flipping through the channels and accordingly that a chat invitation may be sent out. If the new program was not selected in this way, the process may proceed to step 329 in which the wait timer may be set to a different length of time.

In step 329, which may be performed if the new program was not selected in any of the ways addressed in the previous steps, the wait timer may be set to a relatively long amount of time (e.g., 240 seconds) as a default. In this situation, it may be desirable to set the wait timer to a relatively long amount of time because if the new program was not selected in any of the ways addressed in the previous steps, it is likely that the new program is playing simply because the previous program on the same channel recently ended. Thus, the selection of the new program is more likely a coincidence rather than the result of an intentional act by the user, and it accordingly is less likely that the user will continue to watch the selected program or engage in a chat about it. Therefore, as in the situations above where it was less likely that the user would continue to watch the selected program, the device might need to wait for a longer amount of time to determine that the user will continue watching the program and accordingly that a chat invitation may be sent out. Additionally or alternatively, in this situation, it may be the case, for instance, that the user previously set a reminder to view a particular program and the user's device automatically selected the program (e.g., by changing channels) in accordance with the reminder. A relatively longer wait timer may be desirable in this situation because the user may have forgotten about the reminder and might no longer wish to view the particular program associated with the reminder (and thus, as in the previous situation, it may be less likely that the user will continue to watch the newly selected program).

Once it is determined how the new program was selected and the wait timer is set, the device (e.g., gateway 111) may wait for the specified duration in step 330 before performing any further actions. At the end of the wait time, the device may reevaluate the current program in step 331 to determine whether the user selected a new program during the wait time.

If it is determined in step 331 that the user selected a new program during the wait time, then the process may return to step 321 to determine how the program was selected and to again set the wait timer accordingly. On the other hand, if it is determined in step 331 that the user did not select a new program during the wait time (e.g., that the same program is playing as before the wait timer started), then it may be determined in step 332 that a chat invitation should be sent automatically. Subsequently, the new program subroutine may end, and the process may proceed to the next subroutine in the processing loop (e.g., the send chat invite subroutine).

Figure 3F:
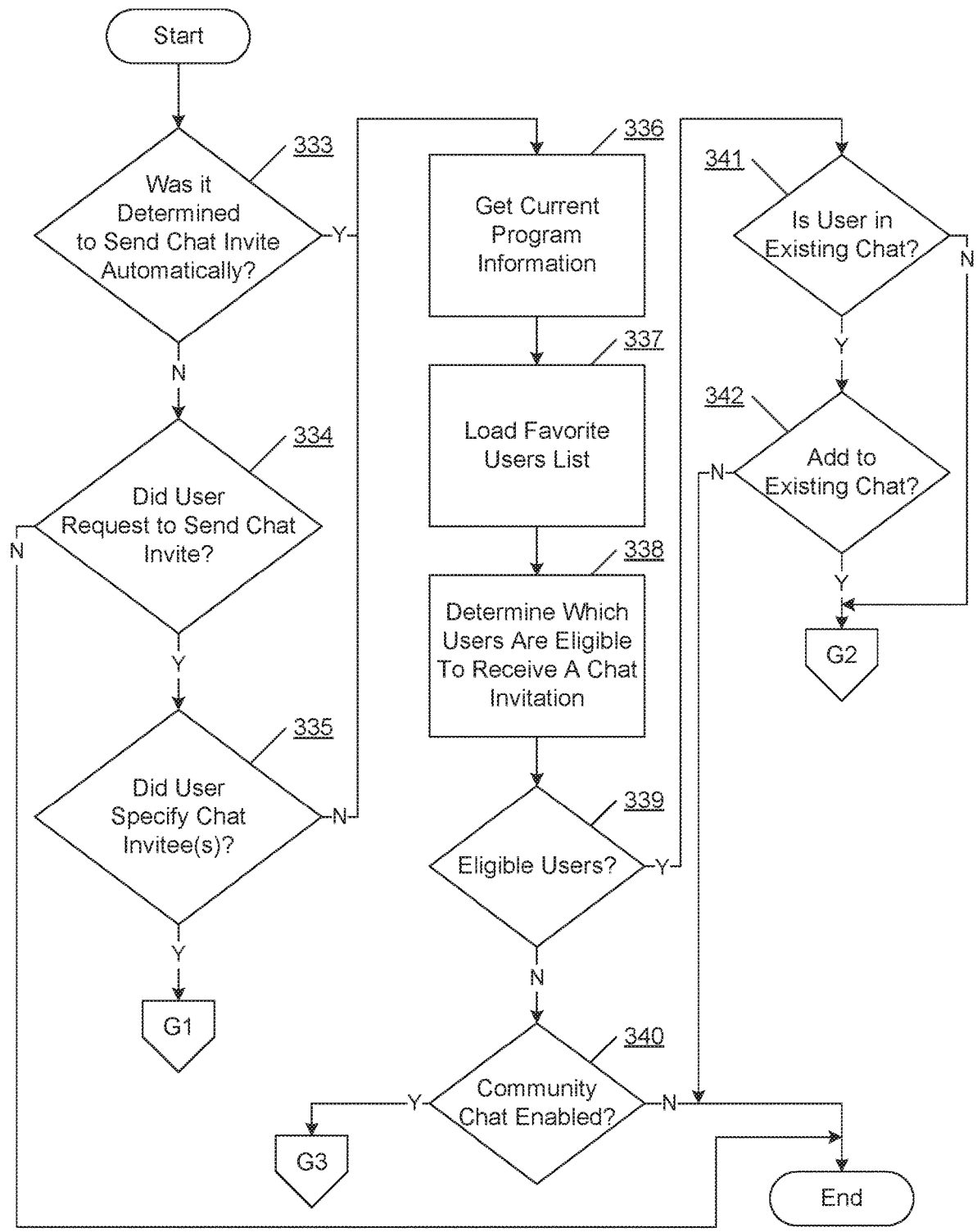
Figure 3G:
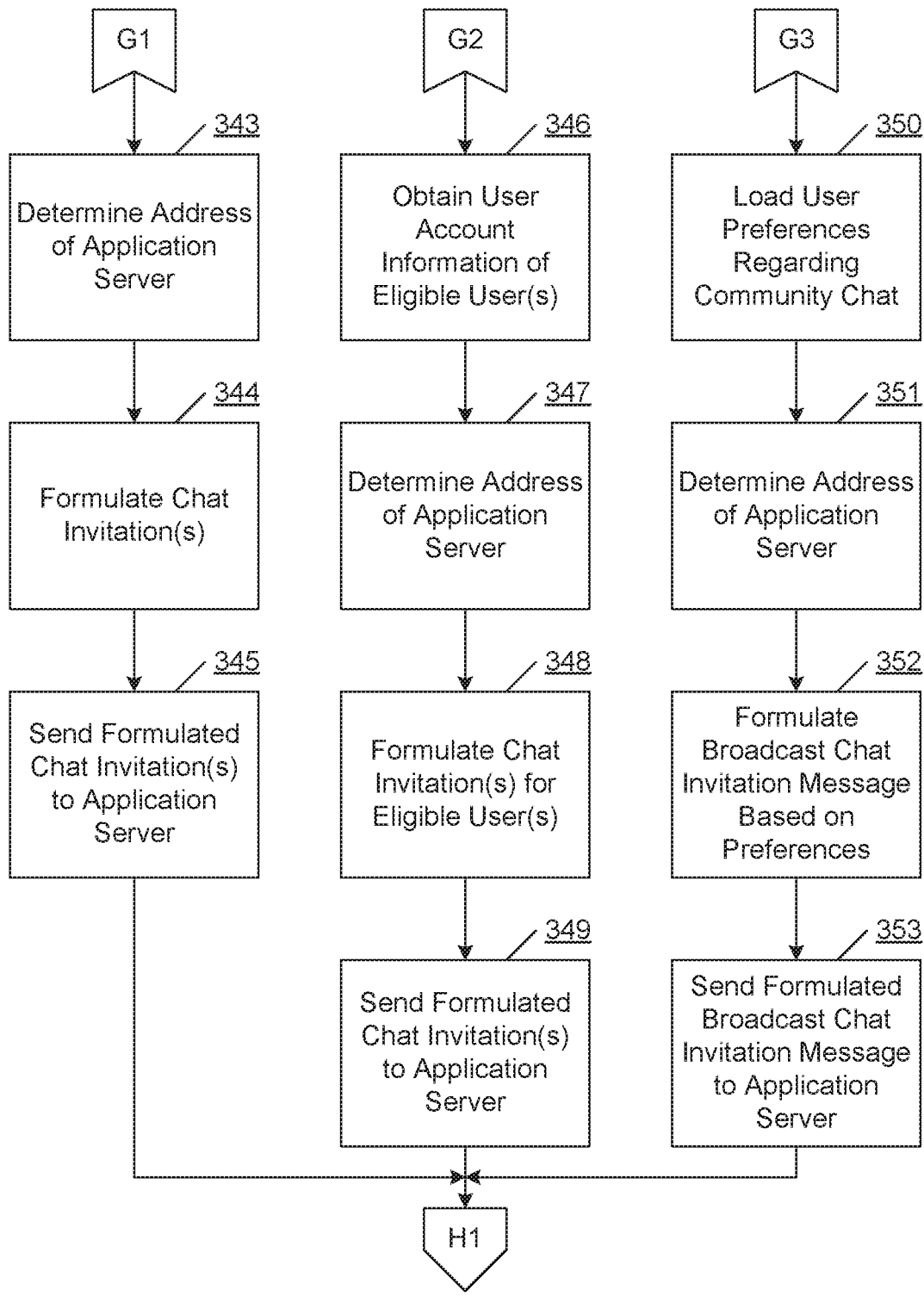
Figure 3H:
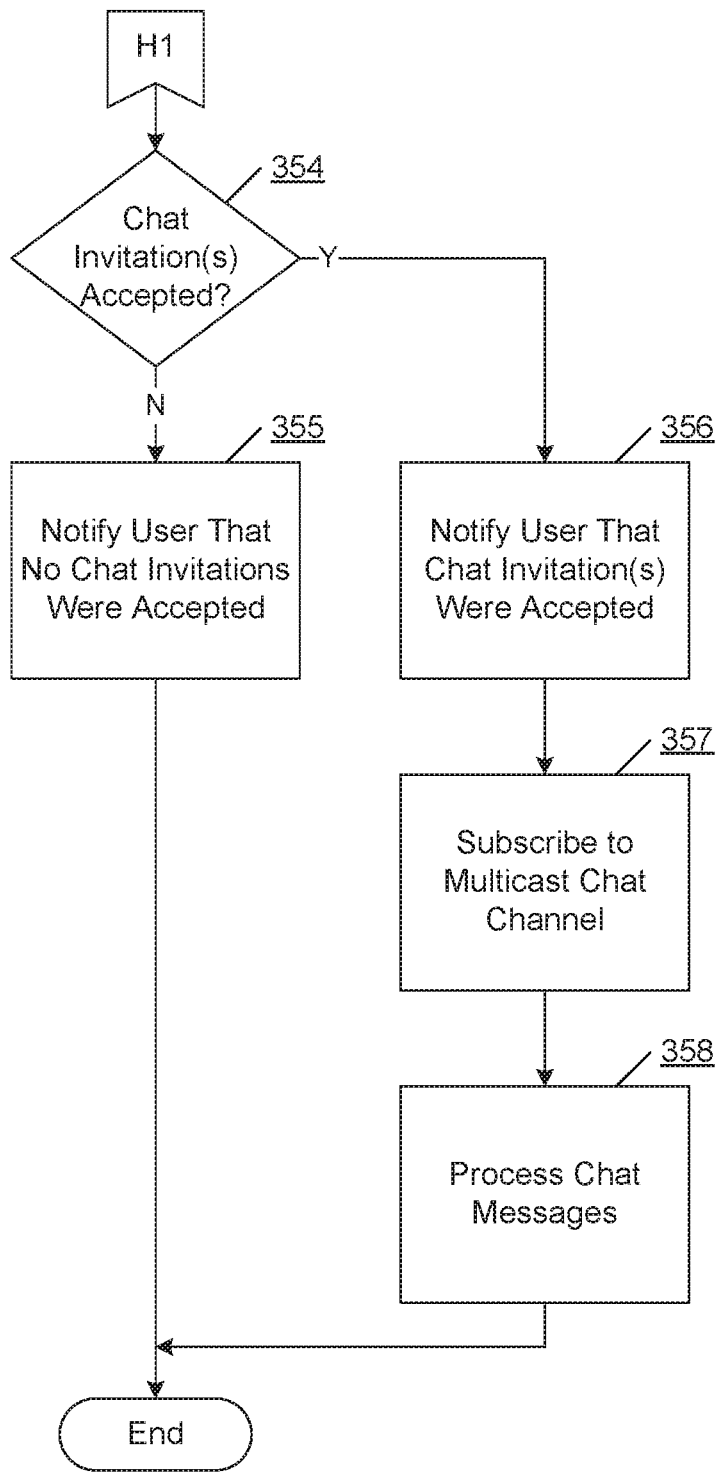

Returning to the overall processing loop of FIG. 3A, once it is determined whether a new program is playing, the process may proceed to step 303, where a chat invitation may be sent to another user or users. As further described below, a chat invitation might only be sent if certain criteria are met (e.g., if it was determined above that chat mode is enabled and that the user is viewing a new program, if the user requested to send a chat invitation, etc.). FIGS. 3F, 3G, and 3H illustrate a send chat invite subroutine that may be performed at this stage of the overall processing loop.

In step 333, it may be determined whether it was previously determined that a chat invitation should be sent automatically (e.g., in step 332, as described above). This may depend, as noted above, on whether chat mode is enabled and whether the user is viewing a new program.

If it is determined in step 333 that it was not previously determined that a chat invitation should be sent automatically, then in step 334, it may be determined whether the user requested to send a chat invitation to one or more other users. If it is determined that the user did not make such a request, then the send chat invite subroutine may end, and the process may proceed to the next subroutine in the processing loop (e.g., the transfer chat subroutine) since the sending of a chat invitation was not automatically triggered nor was it manually requested. On the other hand, if it is determined in step 334 that the user did request to send a chat invitation, then it may be determined in step 335 whether the user specified one or more chat invitees to whom the chat invitation or invitations should be sent.

If it is determined that the user did specify one or more chat invitees to receive one or more chat invitations, then the process may continue to step 343, which is further described below, so that or more chat invitations may be sent to the one or more chat invitees specified by the user. On the other hand, if the user did not specify one or more chat invitees, or if it was determined in step 333 that it was previously determined that a chat invitation should be sent automatically, then the process may proceed to step 336. In a situation where a user requested to send a chat invitation but did not specify any chat invitees, the process may continue as if a chat invitation is to be sent automatically, since in either case, the other users invited to chat are selected automatically in accordance with the subsequent steps of this process.

In step 336, information about the current program may be obtained. The device (e.g., gateway 111) may obtain this program information, for instance, by consulting a previously stored database used for the electronic program guide. Alternatively, a program identifier value received with an incoming data stream can be sent back to an upstream source to request additional information as needed. In this way, the device may obtain the title of the program currently being viewed by the user, the start and end times of the program, the genre of the program, and other desired information (e.g., whether the program is live or prerecorded, whether the program is linear or available on-demand, etc.).

In step 337, a favorite users list may be loaded. For example, the device (e.g., gateway 111) may load the favorite users list previously created or modified in step 316 via the user prioritization menu 700. The device may load this list from local memory (e.g., random access memory included in gateway 111), or if the list is stored on a remote server on an associated network, the device may communicate with the server to receive an updated copy of the list stored at the server. In addition, the device may parse the favorite users list to identify individual users included in the list and their associated contact details (e.g., email addresses, network addresses, etc.).

Having received the favorite users list, it may be determined, in step 338, which users are eligible to receive a chat invitation. In one or more arrangements, this determination may be based on the information about the current program being viewed by the user (which was obtained in step 336). For example, to determine which users are eligible to receive a chat invitation, the device (e.g., gateway 111) may communicate with a server (e.g., application server 107) to obtain presence information about the one or more users included in the favorite users list. The presence information may indicate, for each user, the program currently being viewed by the user, the genre of the program, the start and end time of the program, and/or other information about the user (e.g., whether the user has chat mode enabled, whether the user is watching locally recorded content, such as a program recorded by the user on a DVR, etc.). Subsequently, the device (e.g., gateway 111) may compare the user's current program information with the presence information of the other user or users included in the favorite users list to determine whether any of the other users are viewing the same program as the user of the device. If another user is viewing the same program as the user of the device, then it may be determined that the particular other user is eligible to receive a chat invitation from the user of the device (e.g., because both users are viewing the same program and thus can discuss the program). On the other hand, if a particular other user is not viewing the same program as the user of the device, then it might be determined that the particular other user is not eligible to receive a chat invitation from the user of the device (e.g., because both users are not viewing the same program). The device may evaluate all of the users included in the favorite users list in this manner (e.g., by comparing each user's presence information with the device's user's current program information), to determine which (if any) users are eligible to receive a chat invitation.

In one or more arrangements, whether a user is eligible to chat may further depend upon whether the user's presence information indicates that the user has chat mode enabled. Thus, another user's eligibility to receive a chat invitation may depend on both the program the other user is viewing and whether the other user has chat mode enabled. For example, if a first user's chat device (e.g., gateway 111) determines that another user is viewing the same program as the first user, but the other user does not have chat mode enabled, the first user's device may determine that the other user is not eligible to receive a chat invitation.

Thereafter, in step 339, it may be determined whether any of the users included in the favorite users list are eligible to receive a chat invitation. If it is determined that none of the users included in the favorite users list are eligible to receive a chat invitation, then in step 340, it may be determined whether a community chat mode is enabled. In such a community chat mode, the device may send chat invitations to other users not included in the user's favorite users list. If community chat mode is enabled, the process may proceed to step 350, which is further described below. Alternatively, if community chat mode is not enabled, the send chat invite subroutine may end, and the process may proceed to the next subroutine in the processing loop (e.g., the transfer chat subroutine).

Figure 10:
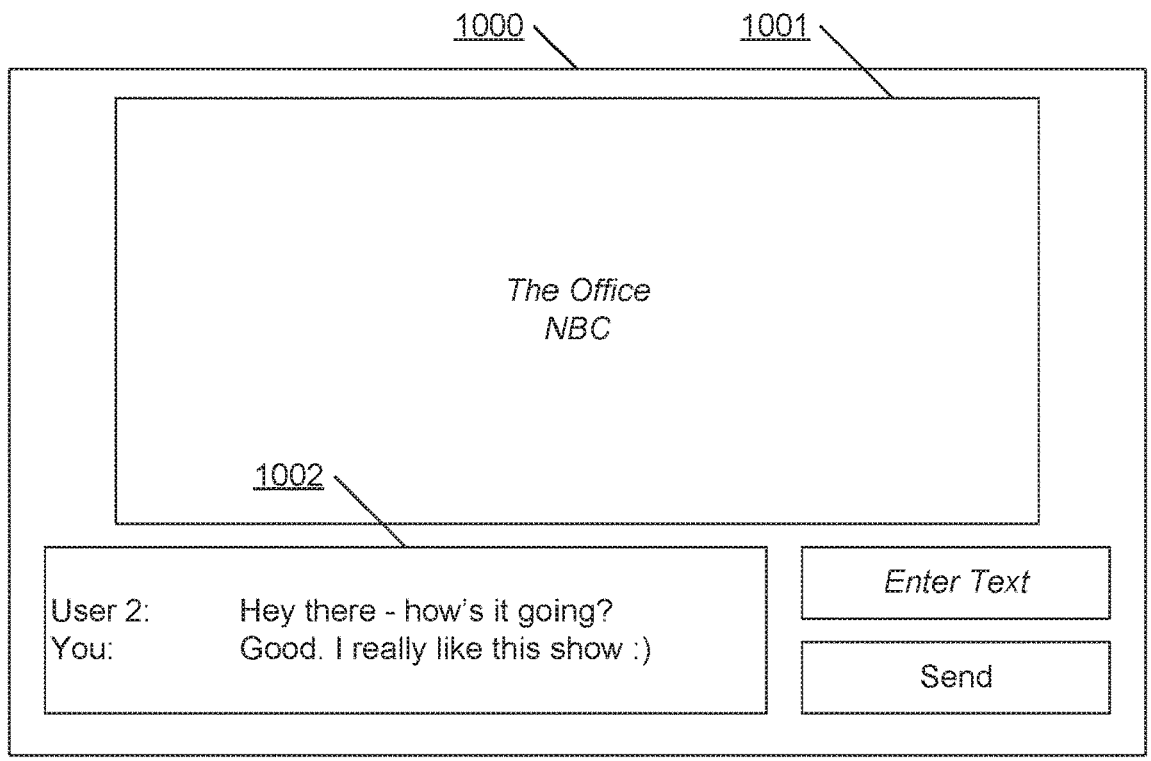
FIG. 10 illustrates an example user interface that includes a chat window according to one or more aspects described herein.

On the other hand, if it is determined in step 339 that one or more users included in the favorite users list are eligible to receive a chat invitation, the process may proceed to step 341 in which it may be determined whether the user is currently in an existing chat. FIG. 10 illustrates an example user interface 1000 that includes a content window 1001 and a chat window 1002 in which messages corresponding to an existing chat session may be displayed.

Figure 11:
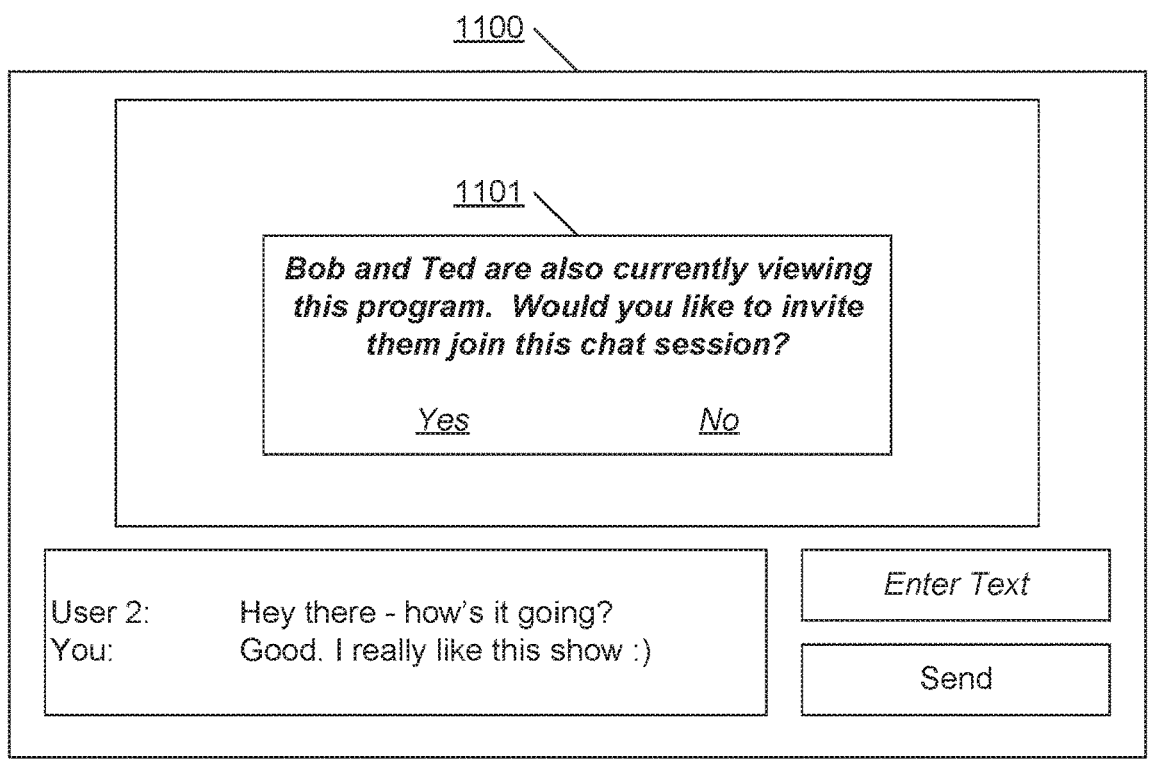
FIG. 11 illustrates an example user interface that includes a prompt to add users to an existing chat session according to one or more aspects described herein.

In some instances, it may be desirable to evaluate whether the user is in an existing chat because the user might wish to continue the existing chat without adding more users to it, or perhaps even close the existing chat and start a new chat. Thus, if it is determined in step 341 that the user is in an existing chat, the user may be prompted as to whether more users should be added to the existing chat in step 342. FIG. 11 illustrates an example user interface 1100 that includes such a prompt 1101.

If it is determined in step 342 that no additional users should be added to the existing chat, then the send chat subroutine may end. Alternatively, if it is determined in step 342 that one or more additional users should be added to the existing chat, or if it was determined in step 341 that the user is not currently in an existing chat, the process may proceed to step 346 to send out chat invitations to the eligible users, as further described below.

In the preceding steps described above (e.g., the steps illustrated in FIG. 3F), the possible recipient or recipients of such a chat invitation were identified. Referring now to FIG. 3G, the several different ways in which a chat invitation may be sent will now be described. As may be seen in the FIGS. 3F and 3G, the path of the flow (and thus the steps performed in sending the chat invitations) may depend which users were identified as possible recipients of the chat invitations.

For example, in a situation where the user of the device (e.g., gateway 111) specified one or more chat invitees to receive one or more chat invitations, the process may proceed from step 333 (described above with respect to FIG. 3F) to step 343 (illustrated in FIG. 3G). In step 343, an address of an application server may be determined. For example, the user's device (e.g., gateway 111) may communicate with central office 103 to determine the address of a chat server (e.g., application server 107). At this time, the user's device may require the address of the chat server because the user's device may send one or more chat invitations to other users via the chat server. In addition, the user's device may need to communicate with the chat server because the chat server may provide other services that enable chat functionalities (e.g., the chat server may create and tear down chat sessions, send and receive chat messages to and from chat participants, etc.), as further described below.

In step 344, the user's device (e.g., gateway 111) may formulate chat invitations. Recall that the situation currently being described is one in which the user specified one or more chat invitation recipients. Thus, in formulating chat invitations, gateway 111 may, for example, generate data objects representing chat invitations, and each data object may include values identifying a user to receive the chat invitation, an address of the user (e.g., an email address, a network address, a network handle, etc.), the sender of the chat invitation, the program currently being played by the sender of the chat invitation, the genre of the program, the amount of time remaining in the program, and/or the like. It may be desirable to include this information in each chat invitation, as each recipient may wish to know who is inviting them to chat and/or what it is that the sender may want to chat about. Each chat invitation may further include capability information about the sender of the chat invitation and/or his or her chat device(s). This capability information may indicate, for instance, whether the sender and/or his or her chat device(s) are capable of audio and/or video chat (e.g., in addition to text chat).

Once the chat invitations are formulated, the user's device (e.g., gateway 111) may transmit the chat invitations to the application server in step 345. Upon receiving the chat invitations from the user's device, the application server (e.g., application server 107) may send the chat invitations along to the intended recipients and wait for a response. Subsequently, the process may proceed to step 354, which is further described below, where the acceptance and/or rejection of the one or more chat invitations may be handled.

As noted above, in some instances, chat invitation recipients might not be specified by the user and instead may be determined automatically by the user's device (e.g., gateway 111). In a situation where the device is to send chat invitations automatically and where the device determined eligible chat recipients based on the user's favorite users list, the process may proceed from step 341 or 342 (described above with respect to FIG. 3F) to step 346 (illustrated in FIG. 3G).

In step 346, user account information for the one or more eligible chat invitation recipients may be obtained. For example, the user's device (e.g., gateway 111) may, for example, retrieve addresses (e.g., email addresses, network addresses, network handles, etc.) for the eligible users, which may be stored as values in the favorite users list.

Subsequently, the user's device (e.g., gateway 111) may determine an address of an application server in step 347. In particular, the user's device may perform the same or substantially similar actions described above with respect to step 343 in which the address of the application server was also determined.

In step 348, one or more chat invitations may be formulated for the one or more eligible users. Here again, the actions that the user's device (e.g., gateway 111) may perform in formulating chat invitations for the eligible users may be similar to those involved in formulating chat invitations in step 344 above. For example, for each eligible user who is to receive a chat invitation, the user's device may generate one or more data objects representing the chat invitation, and each data object may include information identifying the user who is to receive the chat invitation, an address of the recipient user (e.g., an email address, a network address, a network handle, etc.), the sender of the chat invitation, the program currently being played by the sender of the chat invitation, the genre of the program, the amount of time remaining in the program, and/or the like.

Subsequently, in step 349, the formulated chat invitations may be transmitted to the application server for distribution to the eligible users who are to receive the chat invitations. Thereafter, the process may proceed to step 354, which is further described below, where the acceptance and/or rejection of the one or more chat invitations may be handled.

Another situation in which chat invitation recipients are selected automatically by the user's device may arise when a community chat mode is enabled and one or more users on the favorite users list are not eligible to receive a chat invitation. As noted above, in a case where the device is to send chat invitations automatically in a community chat mode, the process may proceed from step 340 (described above with respect to FIG. 3F) to step 350 (illustrated in FIG. 3G).

In step 350, user preferences regarding community chat may be loaded. In one or more arrangements, the user's device may store preferences about community chat that were previously set during the configuration subroutine, and these preferences may affect how the user's device proceeds with formulating and sending chat invitations. For example, these preferences may dictate how many community users are to be invited to chat, whether these community users should be invited if they are only watching the same genre of program as the user rather than the same program itself, and/or the like. In addition, community chat preferences may allow a user to define and/or select groups and/or types of other users that the user of the device prefers to chat with. For example, using community chat preferences, a user may specify that he or she prefers to chat with users in a particular geographic location, of a certain age group, and/or the like. Additionally or alternatively, a user may create or define groups of users who are preferred for chatting, and other users may join such groups via their own community chat preferences.

Subsequently, in step 351, an address of an application server may be determined. For example, the user's device may perform the same or substantially similar actions described above with respect to step 343 in which the address of the application server was also determined.

In step 352, a broadcast chat invitation message may be formulated based on the user's community chat preferences. In one or more arrangements, the broadcast chat invitation message may be similar to the chat invitations described above, but the broadcast chat invitation message may request the application server (e.g., application server 107) to determine the recipients of one or more chat invitations. For example, having previously loaded the user's community chat preferences, the user's device (e.g., gateway 111) may determine that the user's preferences dictate that ten community users should be invited to chat when a community chat invitation is sent. Accordingly, the user's device may, for instance, formulate a broadcast chat invitation message (e.g., one or more data objects) that specifies that chat invitations should be sent to ten community users and identifies the sender of the invitation, the program currently being played by the sender of the invitation, the genre of the program, the amount of time remaining in the program, and/or the like. In addition, the broadcast chat invitation message may include any other constraints or configuration details specified by the user's preferences (e.g., that chat invitations may be sent to community users not only viewing the same program as the user, but also viewing the same genre of program as the user).

Having formulated the broadcast chat invitation message in step 352, the user's device (e.g., gateway 111) may send the formulated broadcast chat invitation message to the application server in step 353. Upon receiving the broadcast chat invitation message from the user's device, the application server may transmit chat invitations to one or more community users in accordance with the broadcast chat invitation message and may wait for a response. Subsequently, the process may proceed to step 354, which is further described below, where the acceptance and/or rejection of the one or more chat invitations may be handled.

Once the one or more chat invitations are sent via any of the above steps, the application server may wait for and process the responses (if any are received) to the one or more chat invitations. Subsequently, the server may transmit one or more messages to the user's device (e.g., gateway 111) that indicate which (if any) chat invitations were accepted, which (if any) chat invitations were rejected, and/or which (if any) chat invitations timed out because they were not responded to within a certain amount of time. Referring now to FIG. 3H, the steps that the user's device may perform in handling these responses to the chat invitations will now be described.

In step 354, the user's device may determine whether one or more of the chat invitations were accepted. In one or more arrangements, this determination may be based on information received from the application server (e.g., application server 107), such as the one or more messages sent by the application server described above.

Figure 12:
FIG. 12 illustrates an example user interface that includes a notification message according to one or more aspects described herein.

If none of the one or more chat invitations were accepted, then in step 355, the user may be notified that no chat invitations were accepted. For example, the user's device (e.g., gateway 111) may cause a notification to be displayed on an associated display device (e.g., television 112) indicating that no chat invitations were accepted. FIG. 12 illustrates an example user interface that includes such a notification.

Figure 13:
FIG. 13 illustrates another example user interface that includes a notification message according to one or more aspects described herein.

On the other hand, if it is determined in step 354 that one or more chat invitations were accepted, then in step 356, the user may be notified that one or more chat invitations were accepted. For example, the user's device (e.g., gateway 111) may cause a notification to be displayed on an associated display device (e.g., television 112) indicating which invitations were accepted. FIG. 13 illustrates an example user interface that includes such a notification.

Subsequently, in step 357, the user's device (e.g., gateway 111) may subscribe to a multicast chat channel. In one or more arrangements, the user's device may subscribe to the multicast chat channel in response to receiving a message from a server (e.g., application server 107) instructing the user's device to subscribe to the channel and providing connection details (e.g., an IP or other network address of the channel, a protocol and/or port associated with receiving and/or sending data through the channel, other networking information, and/or the like) to facilitate receiving chat messages via the channel. Once the user's device is subscribed to the multicast chat channel, the device then may receive one or more chat messages sent by other chat participants. For example, as chat messages are sent by the chat participants to the chat server (e.g., application server 107), the chat server may forward the chat messages into the multicast chat channel, causing the chat messages to be transmitted to all users subscribing to the multicast chat channel (e.g., the chat participants).

Once the user's device (e.g., gateway 111) has subscribed to the multicast chat channel, the device may continue to process chat messages in step 358. Such processing may include, for example, displaying a chat user interface, receiving chat messages via the multicast chat channel, displaying received chat messages, receiving chat messages from a user of the device (e.g., via a user interface), sending chat messages from the user to the chat server for distribution, determining whether the chat session has concluded (e.g., if other participants have left the chat channel), and/or unsubscribing from the chat channel and hiding the chat user interface in response to determining that the chat session has ended. In addition, at this point, the send chat subroutine may end, and the process may proceed to the next subroutine in the processing loop (e.g., the transfer chat subroutine 304).

Figure 14:
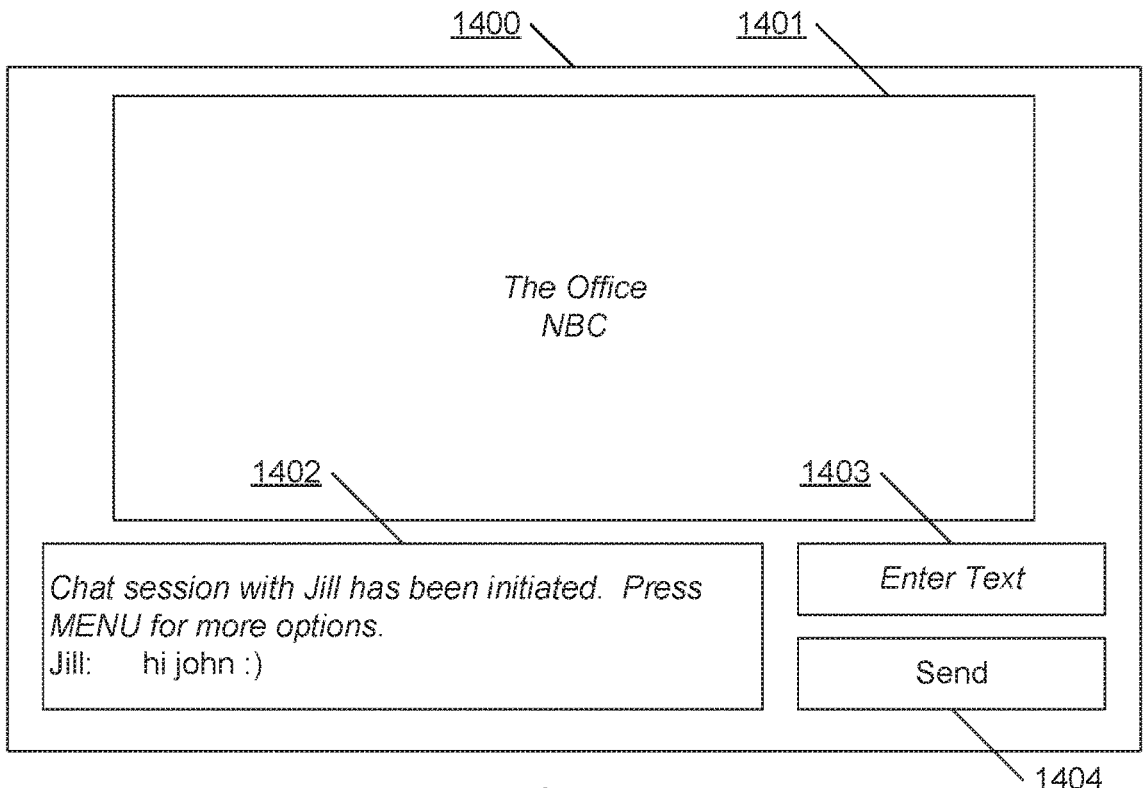
FIG. 14 illustrates another example user interface that includes a chat window according to one or more aspects described herein.

FIG. 14 illustrates an example user interface 1400 that may be displayed by or caused to be displayed by the user's device (e.g., gateway 111) while chat messages are processed during step 358. For instance, user interface 1400 may include a content window 1401 in which content (e.g., television programming, video on demand content, etc.) is played. In addition, user interface 1400 may include, for example, a chat window 1402 in which chat messages (e.g., text, videos, images, embedded sounds, etc.) are displayed and/or accessible. In addition to displaying chat messages in chat window 1402, the system also may display status messages (e.g., "Chat session with Jill has been initiated. Press MENU for more options.") in chat window 1402, as illustrated in FIG. 14. Furthermore, user interface 1400 may include a text box 1403 and a send button 1404 that may allow a user to send chat messages to another user.

In one or more additional arrangements, user interface 1400 may include additional controls (e.g., buttons, text boxes, etc.) that allow the user to specify and/or adjust various aspects of the chat session. For example, user interface 1400 may include one or more buttons that enable the user to convert a text chat session into an audio chat session and/or a video chat session (and vice versa).

Figure 3I:
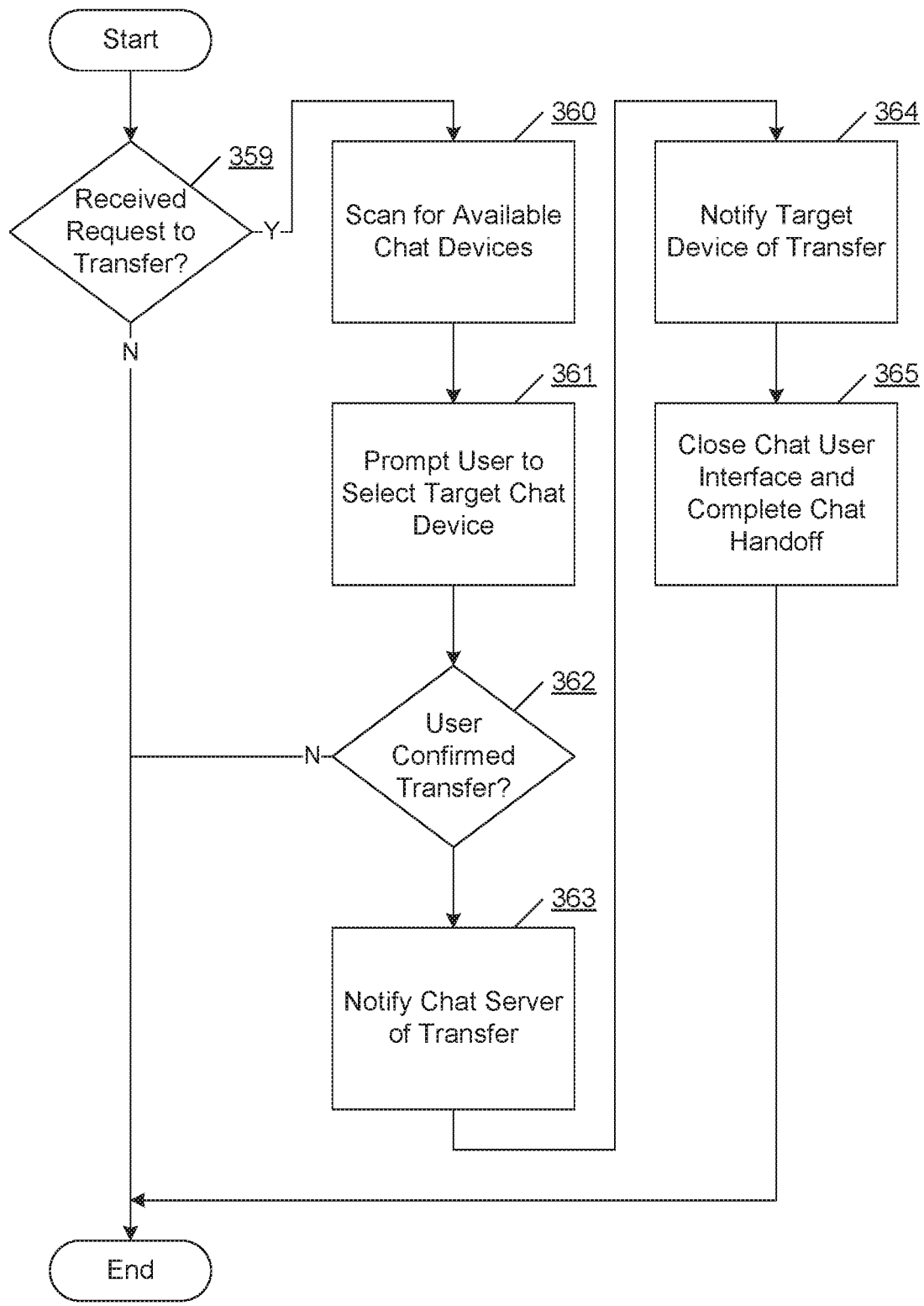

Returning now to the overall processing loop of FIG. 3A, once it is determined whether a new program is playing and whether any chat invitations are to be sent out, the process may proceed to step 304, where a user request to transfer an on-going chat session from one device to another device may be handled. FIG. 3I illustrates a transfer chat subroutine 304 that may be performed at this stage of the overall processing loop.

Figure 15:
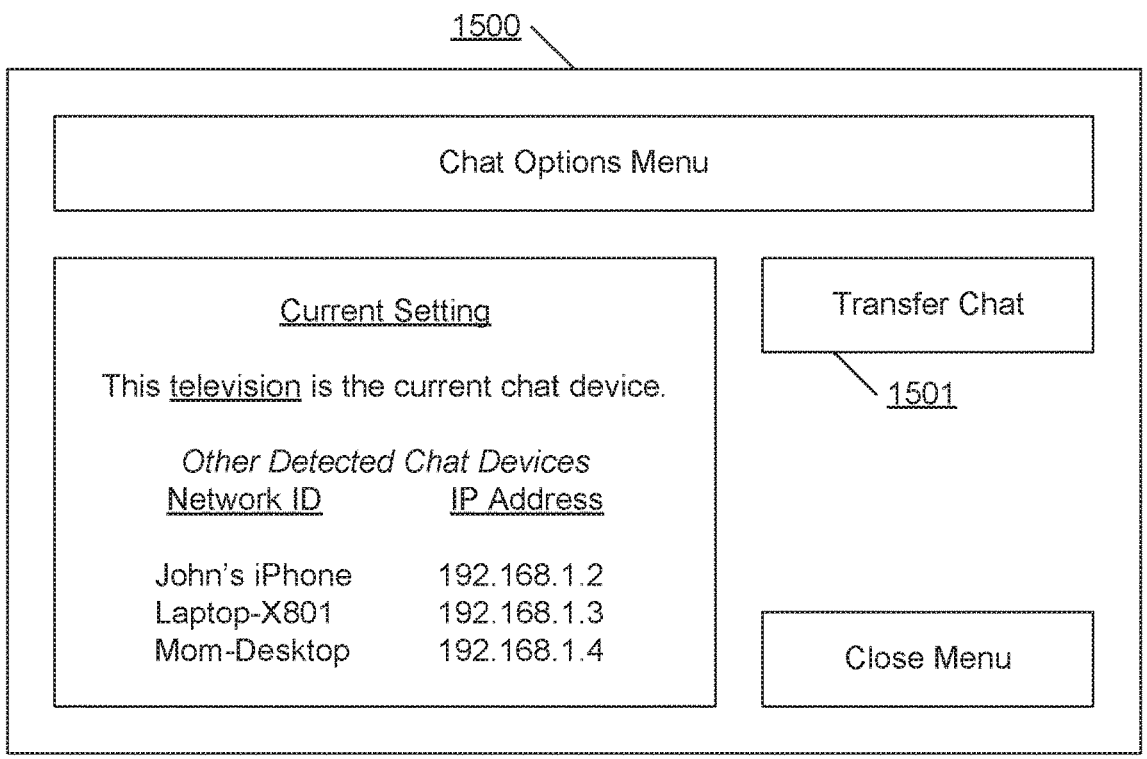
FIG. 15 illustrates an example user interface that includes a chat options menu according to one or more aspects described herein.

In step 359, it may be determined whether a request was received to transfer the chat session to another device. Such a request may be received as user input via a user interface. FIG. 15 illustrates an example user interface 1500 via which such user input may be received. For instance, during a chat mode, a user may request that an options menu, such as user interface 1500, be displayed, and subsequently the user may select the transfer chat button 1501, thus generating this request.

If it is determined that no such request was received, then the transfer chat subroutine may end and the process may proceed to the next subroutine in the processing loop (e.g., the chat invite received subroutine 305, which is further described below). On the other hand, if it is determined in step 359 that a request to transfer the chat session was received, then the process may proceed to step 360 in which the user's device (e.g., gateway 111) may scan for and discover other devices to which the chat session could be transferred. For example, gateway 111 may obtain information about other computing devices connected to a local network at premises 102a by communicating with modem 110 or with a network router. In at least one arrangement, gateway 111 may operate to route data packets in the local network at premises 102a, and thus gateway 111 may determine what computing devices are on the local network and/or able to receive the chat session based on a routing table and/or other information stored by gateway 111.

Figure 16:
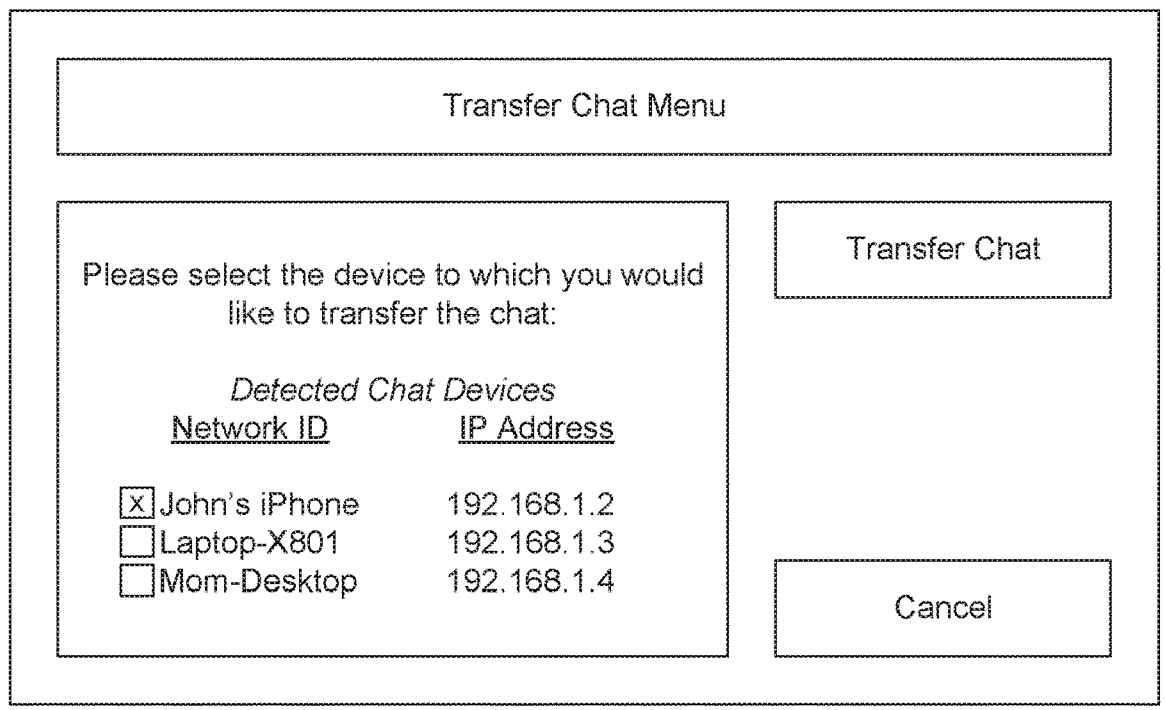
FIG. 16 illustrates an example user interface that includes a prompt to transfer a chat session to another device according to one or more aspects described herein.

Once the user's device (e.g., gateway 111) scans for other available chat devices, the device may prompt the user to select a target chat device to which the chat session should be transferred. FIG. 16 illustrates an example user interface that may be displayed in prompting the user to select such a chat device.

Subsequently, in step 362, the user may be prompted to confirm the transfer of the chat session from the user's current chat device (e.g., gateway 111 and/or television 112) to another device (e.g., laptop computer 115, wireless device 116, etc.). If the transfer is not confirmed by the user, then the transfer chat subroutine may end, and the process may proceed to the next subroutine in the processing loop (e.g., the chat invite received subroutine 305). On the other hand, if the transfer is confirmed by the user in step 362, then in step 363, the user's current chat device (e.g., gateway 111) may notify the chat server (e.g., application server 107) of the transfer of the chat session. Such a notification may be a data message sent upstream via the network from the user's current chat device (e.g., gateway 111) to the chat server.

In response to receiving such a notification, the chat server (e.g., application server 107) may update information associated with the chat session. For example, where the chat server maintains network address details for each chat participant to enable the transmission of chat messages in the multicast chat channel, the chat server may update the network address details for the transferring user to include the network address for the transferring user's new chat device and/or to otherwise reflect the change. This update may result, for example, in the target chat device receiving chat messages sent by other chat participants and distributed by the chat server via the multicast chat channel, instead of the user's current device receiving such messages.

Subsequently, the user's current chat device (e.g., gateway 111) may notify the target chat device (e.g., wireless device 116) of the transfer of the chat session. This notification may, for example, take the form of one or more data messages sent from the user's current chat device (e.g., gateway 111) to the target chat device (e.g., wireless device 116) via the local network at premises 102a.

Figure 17:
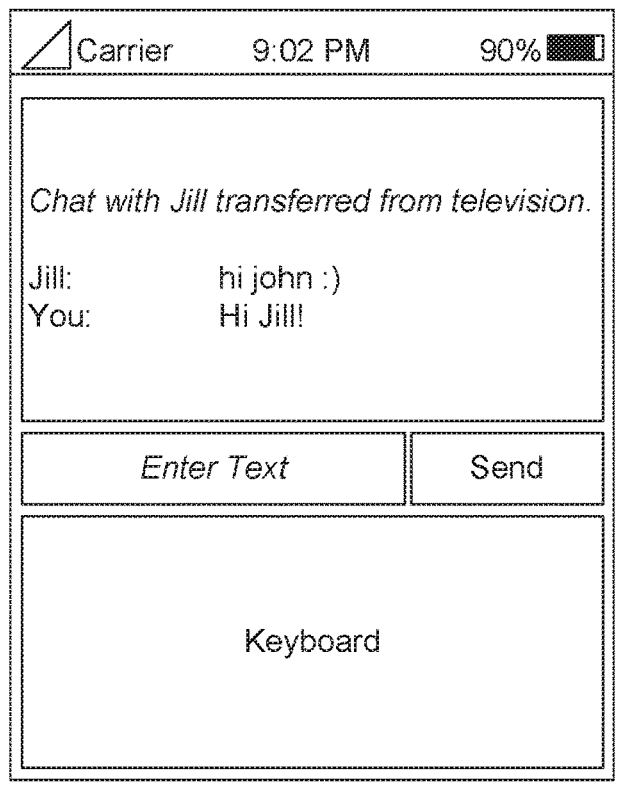
FIG. 17 illustrates an example user interface that includes a chat window and other controls for participating in a chat session that has been transferred to another device according to one or more aspects described herein.

In response to receiving such a notification, the target chat device (e.g., wireless device 116) may subscribe to the multicast chat channel and process chat messages similar to how the user's current chat device (e.g., gateway 111) performed such actions (e.g., as described above with respect to steps 357 and 358). FIG. 17 illustrates an example user interface that may be displayed by the target chat device at this stage when the target chat device performs such actions.

Thereafter, in step 365, the user's current chat device (e.g., gateway 111) may close the chat user interface (or otherwise cause such user interface to no longer be displayed to the user) and perform any other actions associated with completing the handoff of the chat session to the target chat device (e.g., wireless device 116). Having transferred the chat session to the target chat device, the user's original chat device (e.g., gateway 111) may continue to perform other aspects of the processing loop (e.g., the other subroutines described herein), as the target chat device (e.g., wireless device 116) might only handle the processing of chat messages, thus leaving the user's original chat device to handle the rest of the processing operations described herein. In addition, once the handoff of the chat session is complete, the transfer chat subroutine may end, and the process may proceed to executing the next subroutine in the processing loop (e.g., the chat invite received subroutine 305).

Figure 3J:
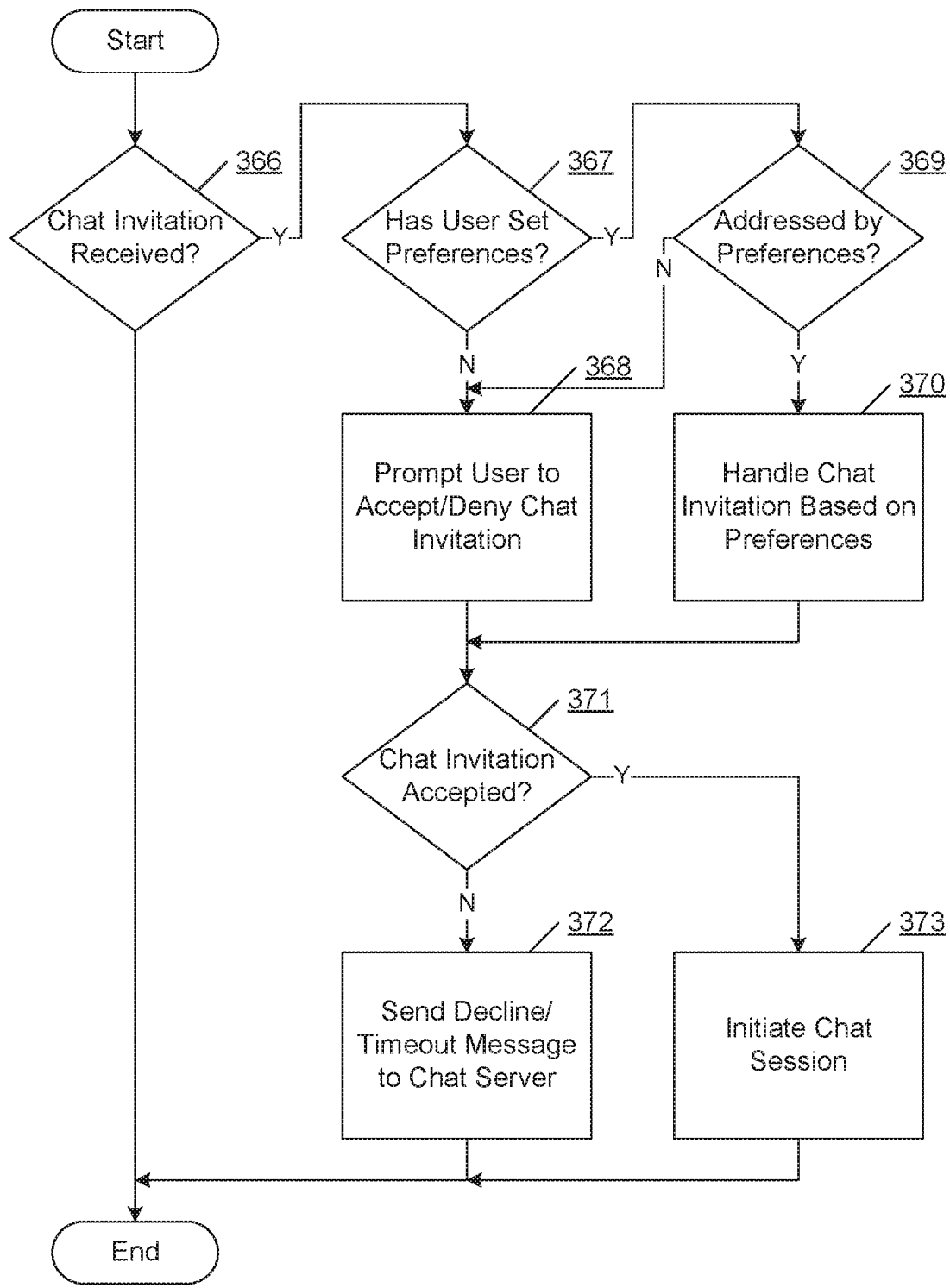

Referring now to the overall processing loop of FIG. 3A, once any request to transfer the chat is handled, the process may proceed to step 305, where an incoming chat invitation may be handled. FIG. 3J illustrates a chat invite received subroutine that may be performed at this stage of the overall processing loop.

In step 366, it may be determined whether an incoming chat invitation was received. In one or more arrangements, the user's chat device (e.g., gateway 111) may receive an incoming chat invitation from another user in the form of a downstream data message sent by a chat server (e.g., application server 107).

If it is determined that an incoming chat invitation was not received, then the chat invite received subroutine may end, and the process may return to the beginning of the processing loop (e.g., the configuration subroutine 301). On the other hand, if it is determined in step 366 that an incoming chat invitation was received, then in step 367, it may be determined whether the user has previously set preferences for how incoming chat invitations should be handled (e.g., via one or more of the example user interfaces described above with respect to the configuration subroutine, via one or more other preference menus, etc.).

Figure 18:
FIG. 18 illustrates an example user interface that includes a prompt presenting a chat invitation according to one or more aspects described herein.

If the user has not set preferences for how incoming chat invitations should be handled, then in step 368, the user may be prompted to accept or deny the chat invitation. FIG. 18 illustrates an example user interface that includes such a prompt.

On the other hand, if it is determined in step 367 that the user has set preferences for how incoming chat invitations should be handled, then in step 369, it may be determined whether the incoming chat invitation is addressed by the user's preferences. For instance, the user might have only set a preference specifying that all chat invitations from users on the user's favorite users list should be automatically accepted; but if the user were to receive a chat invitation from a user not on the user's favorite user's list, the chat invitation is not addressed by the user's preferences in this example.

If it is determined in step 369 that the incoming chat invitation is address by the user's preferences, then in step 370, the chat invitation may be handled in accordance with the user's preferences. For example, if the incoming chat invitation is addressed by preferences previously set by the user (e.g., during the configuration subroutine), the user's chat device (e.g., gateway 111) may handle the chat invitation in accordance with those preferences by, for instance, accepting the chat invitation, rejecting the chat invitation, or simply allowing the chat invitation to time out without sending any response to the chat server.

On the other hand, if it is determined in step 369 that the incoming chat invitation is not addressed by the user's preferences, then the process may proceed to step 368 where the user may be prompted to accept or deny the chat invitation. As noted above, FIG. 18 illustrates an example user interface that includes such a prompt.

Whether the user is prompted in step 368 or the chat invitation is handled based on the user's preferences in step 370, it may be determined in step 371 whether the chat invitation was accepted. If the chat invitation was not accepted (e.g., if the chat invitation was rejected or timed out due to lack of a response), then in step 372, the user's chat device (e.g., gateway 111) may send a message to the chat server (e.g., application server 107) indicating that the chat invitation was declined or timed out. Alternatively, if the chat invitation was accepted, then in step 373, the user's chat device (e.g., gateway 111) may initiate chat session, which may involve, for example, sending a notification message to the chat server indicating that the chat invitation was accepted, subscribing to a multicast channel, and processing chat messages, as described above with respect to steps 357 and 358. Subsequently, the chat invite received subroutine may end, and the process may return to the beginning of the processing loop (e.g., the configuration subroutine 301).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and that one or more steps illustrated may be optional in accordance with aspects of the disclosure.

One example modification may deal with the device generating the chat invitations. In the example flow above, the user's device or gateway 111 may generate the invitations. In alternative embodiments, that activity may be performed by an external server, such as an application server 107 handling the chat application.

It will also be appreciated and understood that modifications may be made without departing from the true spirit and scope of the present disclosure. The description is thus to be regarded as illustrative instead of restrictive on the present disclosure.

The invention claimed is:

1. A method comprising:
causing output of video content;
sending, by a first user device and based on a genre of the video content, one or more invitations to a textual communication session related to the video content, wherein the one or more invitations are generated using a list of genres, and wherein the list comprises, for each of the genres, a corresponding list of users;
receiving, by the first user device, a request to transfer, from the first user device and to a second user device, the textual communication session; and
transferring, from the first user device and to the second user device, the textual communication session related to the video content.

2. The method of claim 1, wherein the first user device and the second user device are different devices that are both located at a same premises.

3. The method of claim 1, wherein prior to the transferring, the first user device outputs a display indicating:
a current text communication device; and
a plurality of other text communication devices that have been detected on a network local to the first user device.

4. The method of claim 1, further comprising selecting, by the first user device, the second user device based on communication capabilities of available target devices.

5. The method of claim 1, further comprising selecting, by the first user device, the second user device based on determining that the second user device is equipped with one or more of a display screen, a keyboard, audio communication functionality, or video communication functionality.

6. The method of claim 1, further comprising selecting the second user device by:
determining, by the first user device, other devices associated with a local network used for the textual communication session;
receiving, by the first user device, information indicating communication capabilities of the other devices;
generating, by the first user device and based on the information indicating communication capabilities of the other devices, a list of potential target devices; and
receiving a user selection, from the list of potential target devices, of the second user device.

7. The method of claim 1, further comprising sending, by the first user device, a request to a server to send future textual communication messages, from other users participating in the textual communication session related to the video content, to the second user device instead of the first user device.

8. The method of claim 1, wherein the sending the one or more invitations comprises automatically sending, by the first user device and based on the video content being selected for viewing, the one or more invitations.

9. The method of claim 1, further comprising:
automatically sending textual communication invitations based on programs being selected for viewing; and
waiting different amounts of time, before automatically sending the textual communication invitations, based on a manner in which the programs were selected for viewing.

10. A method comprising:
receiving, by a second user device, a message indicating a request to receive future communications, from users participating in a textual communication session, at the second user device instead of at a first user device, wherein the textual communication session was initiated based on one or more invitations, sent to the users, that were generated using a list of genres, and wherein the list comprises, for each of the genres, a corresponding list of users;
sending, to the first user device, information indicating communication capabilities of the second user device;
continuing the textual communication session via the second user device.

11. The method of claim 10, wherein the first user device and the second user device are different devices that are both located at a same premises.

12. The method of claim 10, further comprising outputting, by the second user device, a display indicating:
a current text communication device; and
a plurality of other text communication devices that have been detected on a network local to the first user device.

13. The method of claim 10, wherein the information indicating communication capabilities indicates whether the second user device is equipped with one or more of a display screen, a keyboard, audio communication functionality, or video communication functionality.

14. The method of claim 10, further comprising storing user preference information, associated with the second user device, to automatically send, based on selections of new programs for viewing, invitations to textual communication sessions associated with the programs.

15. The method of claim 10, further comprising:
automatically sending textual communication invitations based on programs being selected for viewing; and
waiting different amounts of time, before automatically sending the textual communication invitations, based on a manner in which the programs were selected for viewing.

16. The method of claim 10, further comprising outputting, via the second user device, a notification of the request, a topic for the textual communication session, and a selectable option to accept the request.

17. A method comprising:
using, by a server to generate one or more textual communication invitations, a list of genres that comprises, for each of the genres, a corresponding list of one or more users;
initiating, by the server and using the one or more textual communication invitations, a textual communication session between a first user device and a second user device;
receiving, by the server, a request indicating that a user associated with the first user device wishes to continue the textual communication session using a target device instead of the first user device; and
sending, by the server and to the target device instead of the first user device, future messages for the textual communication session.

18. The method of claim 17, further comprising using, by the server to generate the one or more textual communication invitations, a list of programs that comprises, for each of the programs, a corresponding list of one or more users.

19. The method of claim 17, further comprising using, by the server, communication capability information of the target device to distribute an invitation to either one of an audio communication session or a video communication session.

20. The method of claim 17, wherein the first user device and the second user device are both located at a same premises and associated with a user.

21. The method of claim 1, further comprising:
sending one or more first invitations to join the textual communication session; and
based on determining that the one or more first invitations were declined, prompting a user associated with the first user device to change one or more textual communication settings.

22. The method of claim 1, further comprising, prompting, by the first user device, a user to select the second user device from a list of potential target devices.

\* \* \* \* \*

UNITED STATES PATENT AND TRADEMARK OFFICE
CERTIFICATE OF CORRECTION

PATENT NO. : 11,516,035 B2
APPLICATION NO. : 16/945177
DATED : November 29, 2022
INVENTOR(S) : Paluch It is certified that error appears in the above-identified patent and that said Letters Patent is hereby corrected as shown below:

In the Claims

Column 22, Claim 10, Line 20:
After "device;", insert --and-- therefor

Signed and Sealed this
Nineteenth Day of March, 2024

Katherine Kelly Vidal
*Director of the United States Patent and Trademark Office*